United States Patent
Ross et al.

(10) Patent No.: US 10,740,780 B2
(45) Date of Patent: Aug. 11, 2020

(54) METHOD AND SYSTEM FOR PROVIDING CUSTOMERS OF A RETAIL ENTERPRISE WITH EARNABLE REWARDS

(71) Applicant: Meijer, Inc., Grand Rapids, MI (US)

(72) Inventors: Kenneth Ross, Grand Rapids, MI (US); Lanny Curtis, Howard City, MI (US); Brian Pugh, Grand Rapids, MI (US); Elmer L Robinson, Jr., Marne, MI (US); David Scott Pallas, Hudsonville, MI (US); Nathan Wall Phelps, Cedar Springs, MI (US)

(73) Assignee: Meijer, Inc., Grand Rapids, MI (US)

( * ) Notice: Subject to any disclaimer, the term of this patent is extended or adjusted under 35 U.S.C. 154(b) by 458 days.

(21) Appl. No.: 13/799,789

(22) Filed: Mar. 13, 2013

(65) Prior Publication Data
US 2013/0246148 A1    Sep. 19, 2013

Related U.S. Application Data

(60) Provisional application No. 61/610,920, filed on Mar. 14, 2012, provisional application No. 61/737,043, filed on Dec. 13, 2012.

(51) Int. Cl.
    *G06Q 30/02* (2012.01)
(52) U.S. Cl.
    CPC .................. *G06Q 30/0224* (2013.01)
(58) Field of Classification Search
    USPC .................................. 705/14.41, 41
    See application file for complete search history.

(56) References Cited

U.S. PATENT DOCUMENTS

| | | | |
|---|---|---|---|
| 6,026,370 A * | 2/2000 | Jermyn | 705/14.41 |
| 6,456,981 B1 * | 9/2002 | Dejaeger | G06Q 30/02 |
| | | | 705/14.38 |
| 7,392,224 B1 * | 6/2008 | Bauer et al. | 705/41 |
| 7,618,318 B2 | 11/2009 | Ciancio et al. | |
| 8,489,452 B1 | 7/2013 | Warner et al. | |
| 8,533,032 B2 | 9/2013 | Main et al. | |
| 2001/0014868 A1 * | 8/2001 | Herz | G06Q 30/02 |
| | | | 705/14.38 |
| 2003/0032474 A1 * | 2/2003 | Kaminkow | G06Q 20/3433 |
| | | | 463/25 |
| 2004/0044573 A1 * | 3/2004 | Barous | G06Q 30/02 |
| | | | 705/14.39 |

* cited by examiner

*Primary Examiner* — Saba Dagnew
(74) *Attorney, Agent, or Firm* — Barnes & Thornburg, LLP

(57) ABSTRACT

A shopper reward server includes a communication module to receive purchase transaction data from a plurality of purchase interfaces of a retail enterprise, a database having stored therein a plurality of shopper purchase histories each including purchase transaction data for item purchases made over time by a different one of a corresponding plurality of shoppers, a transaction module to store purchase transaction data for each shopper in a corresponding shopper purchase history, and a shopper reward module to selectively generate for any of the shoppers at least one earn requirement, based on that shopper's purchase history, that must be satisfied by the shopper via at least one purchase made via any of the purchase interfaces in order to earn a corresponding discount reward redeemable against at least one specified item via any of the purchase interfaces.

42 Claims, 10 Drawing Sheets

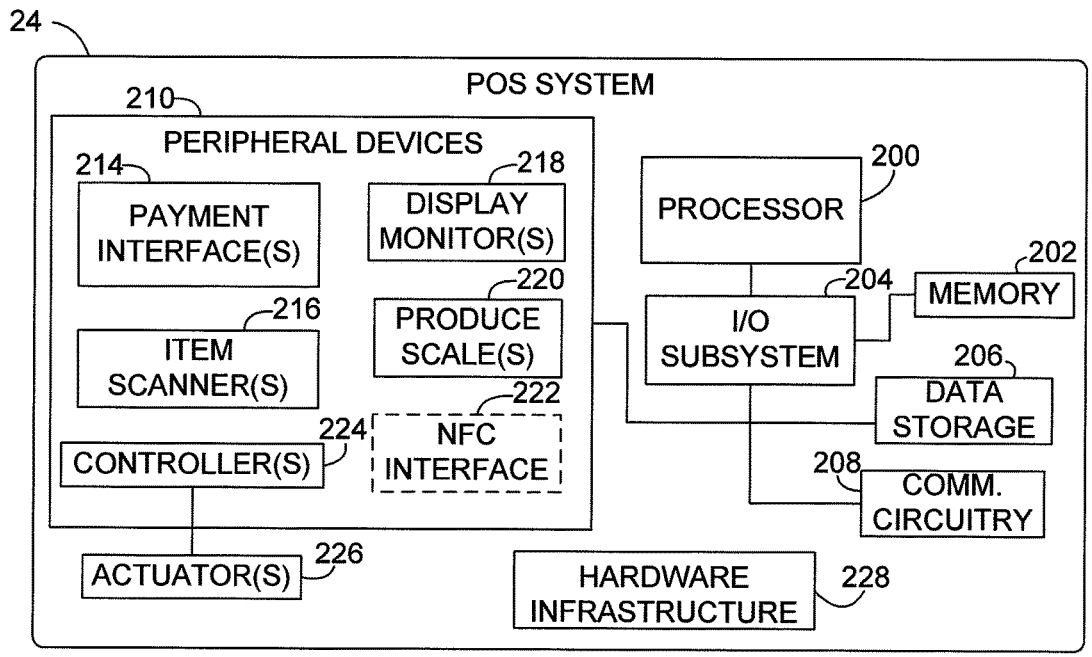
FIG. 2
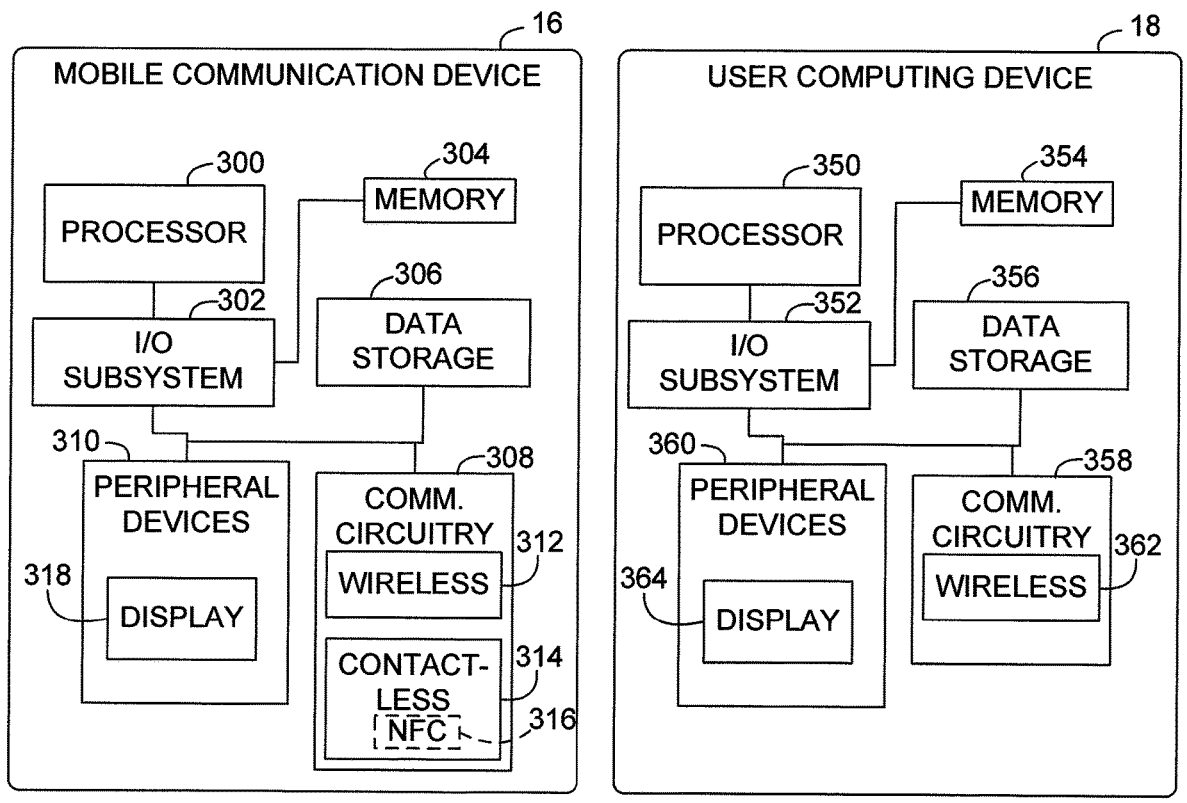
FIG. 3A
FIG. 3B

METHOD AND SYSTEM FOR PROVIDING CUSTOMERS OF A RETAIL ENTERPRISE WITH EARNABLE REWARDS

CROSS-REFERENCE TO RELATED APPLICATIONS

This patent application claims the benefit of, and priority to, U.S. Provisional Patent Application Ser. No. 61/610,920, filed Mar. 14, 2012, and to U.S. Provisional Patent Application Ser. No. 61/737,043, filed Dec. 13, 2012, the disclosures of which are each incorporated herein by reference.

FIELD OF THE INVENTION

The present invention relates generally to incentive programs for customers of retail enterprises, and more specifically to systems for providing customers of retail enterprises with earnable rewards in the form of one or more redeemable product and/or service discount coupons.

BACKGROUND

Retailers of goods and services may typically offer such goods and services for purchase via one or more conventional brick-and-mortar retail outlets and/or via one or more Internet-accessible websites, i.e., one or more websites accessible via a global system of interconnected computer networks. In either case it is desirable for retailers to make available features and/or programs that enhance the shopping experience in order to increase the likelihood that shoppers will become, or will continue to be, return shoppers.

SUMMARY

The present invention may comprise one or more of the features recited in the attached claims, and/or one or more of the following features and combinations thereof. A shopper reward server may comprise a communication module to receive purchase transaction data from a plurality of purchase interfaces of retail enterprise, a database, a transaction module and a shopper reward module. The purchase transaction data may relate to items purchased by shoppers during purchase transactions carried out via the plurality of purchase interfaces. The database may have stored therein a plurality of shopper purchase histories each including purchase transaction data for item purchases made over time by a different one of a corresponding plurality of shoppers. The transaction module may store purchase transaction data for each of the plurality of shoppers in a corresponding one of the plurality of shopper purchase histories. The shopper reward module may selectively generate for any of the plurality of shoppers at least one earn requirement, based on that shopper's one of the plurality of shopper purchase histories, that must be satisfied by the shopper via at least one purchase made via any of the plurality of purchase interfaces in order to earn a corresponding discount reward redeemable against at least one specified item via any of the plurality of purchase interfaces.

The database may include a rewards repository for each of the plurality of shoppers. The shopper reward module may monitor purchases made by the shopper following selection by the shopper of the earn requirement and the corresponding discount reward, and add the discount reward to the shopper's rewards repository when the shopper satisfies the earn requirement. The shopper reward module may add the discount reward to the shopper's rewards repository only if the shopper satisfies the earn requirement within a specified earn time period following selection by the shopper of the earn requirement and corresponding discount reward. Alternatively or additionally, the shopper reward module may allow redemption of the discount reward against the at least one item only if the discount reward is redeemed against the at least one item within a reward redemption time period following addition of the discount reward to the shopper's rewards repository.

The shopper reward module may selectively generate the at least one earn requirement based on the shopper's one of the plurality of shopper purchase histories and also on the plurality of shopper purchase histories.

The shopper reward module may generate a plurality of different pairs of earn requirements, and corresponding discount rewards, based on the shopper's one of the plurality of shopper histories, and to allow selection by the shopper of one of the plurality of different earn requirements to satisfy in order to earn the corresponding discount reward.

The shopper reward module may allow the shopper to specify the discount reward, and may generate the at least one earn requirement, based on the shopper's one of the plurality of shopper purchase histories, that must be satisfied by the shopper via at least one purchase made via any of the plurality of purchase interfaces in order to earn the specified discount reward. The shopper reward module may generate a plurality of different earn requirements, based on the shopper's one of the plurality of shopper purchase histories, that must each be satisfied by the shopper via at least one purchase made via any of the plurality of purchase interfaces in order to earn the specified discount reward, and the shopper reward module may allow selection by the shopper of one of the plurality of different earn requirements to satisfy in order to earn the specified discount reward.

The database may have stored therein at least one set of earn rules defining a plurality of earn categories each corresponding to a different category of one or more products or services offered for sale by the retail enterprise.

The shopper reward server may further comprise a shopper history management module to process the purchase transaction data in each of the plurality of shopper purchase histories to determine a total amount spent by each of the plurality of shoppers in each of the plurality of earn categories and to determine a total amount spent by all of the plurality of shoppers in each of the plurality of earn categories.

The at least one set of earn rules may define at least one set of earn category ranking rules for ranking each of the plurality of earn categories relative to each other as a function of the total amount spent by all of the plurality of shoppers in each of the plurality of earn categories.

The shopper reward server may further comprise an offer bank management module to calculate and periodically update earn category rankings for each of the plurality of earn categories relative to each other based on the at least one set of earn category ranking rules and on the most recent total amount spent by all of the plurality of shoppers in each of the plurality of earn categories.

The at least one set of earn rules may define minimum and maximum spend thresholds for each of the plurality of earn categories, and further defines a plurality of spend ranges between the defined minimum and maximum spend thresholds of each of the plurality of earn, categories, and the at least one set of earn rules may define at least one set of earn margin rules for establishing an earn margin for each of the plurality of earn categories, each earn margin defining a number of spend range increments as a function of the total amount spent by all of the plurality of shoppers, in each of the plurality of earn categories.

The offer bank management module may calculate and periodically update earn margins for each of the plurality of earn categories based on the at least one set of earn margin rules and on the most recent total amount spent by all of the plurality of shoppers in each of the plurality of earn categories.

The database may have stored therein at least one set of reward rules defining a plurality of reward categories each corresponding to a different category of one or more products or services offered for sale by the retail enterprise, and a plurality of reward types each corresponding to a different type of discount reward, and the at least one set of reward rules may define minimum and maximum reward thresholds for each of the plurality of reward categories and reward types, and further defines a plurality of reward increments between the defined minimum and maximum reward thresholds of each of the plurality of reward categories and reward types, and the at least one set of reward rules may define at least one set of reward category and reward type ranking rules for ranking each of the plurality of reward categories and reward types relative to each other as a function of the earn category rankings for each of the plurality of earn categories.

The offer bank management module may construct and periodically update an offer bank of pairs of earn requirements and corresponding discount rewards based on the plurality of earn categories, the plurality of spend ranges between the defined minimum and maximum spend thresholds of each of the plurality of earn categories, the earn category rankings for each of the plurality of earn categories, the earn margins for each of the plurality of earn categories, the plurality of reward categories, the plurality of reward types, and the plurality of reward increments between the defined minimum and maximum reward thresholds of each of the plurality of reward categories and reward types.

The shopper reward module may generate a plurality of different pairs of earn requirements and corresponding discount rewards specific to the shopper from the offer bank of pairs of earn requirements and corresponding discount rewards based on the shoppers one of the plurality of shopper histories.

The shopper reward module may determine a shopper-specific ranking of each of the plurality of earn categories relative to each other based on the total amount spent by the shopper in each of the plurality of earn categories, to determine a shopper-specific ranking of each of the plurality of reward categories based on the shopper-specific rankings of the plurality of earn categories, and compare the shopper-specific rankings of the plurality of earn categories and the shopper-specific rankings of the plurality of reward categories to the offer bank of pairs of earn requirements and corresponding discount rewards to generate a list of the plurality of different pairs of earn requirements and corresponding discount rewards specific to the shopper.

The shopper reward module may filter the shopper-specific rankings of the plurality of earn categories and the shopper-specific rankings of the plurality of reward categories based on historical discount reward selection preferences of the shopper prior to comparing the shopper-specific rankings of the plurality of earn categories and the shopper-specific rankings of the plurality of reward categories to the offer bank of pairs of earn requirements and corresponding discount rewards.

The shopper reward module may allow selection by the shopper of one of the plurality of different pairs of earn requirements and corresponding discount rewards from the list of the plurality of different pairs of earn requirements and corresponding discount rewards specific to the shopper.

The database may include a rewards repository for each of the plurality of shoppers, and the shopper reward module may monitor purchases made by the shopper following selection by the shopper of the one of the plurality of different pairs of earn requirements and corresponding discount reward, and to add the discount reward to the shopper's rewards repository when the shopper satisfies the earn requirement.

The shopper reward module may add the discount reward to the shopper's rewards repository only if the shopper satisfies the earn requirement within a specified earn time period following selection by the shopper of the one of the plurality of different pairs of earn requirements and corresponding discount reward.

The shopper reward module may allow redemption of the discount reward against the at least one item only if the discount reward is redeemed against the at least one item within a reward redemption time period following addition of the discount reward to the shoppers rewards repository.

The shopper reward module may allow the shopper to specify the discount reward, and the shopper reward module may generate a plurality of earn requirements from the offer bank of pairs of earn requirements based on the discount reward specified by the shopper and based on the shoppers one of the plurality of shopper histories.

The shopper reward module may determine a shopper-specific ranking of each of the plurality of earn categories relative to each other based on the total amount spent by the shopper in each of the plurality of earn categories, and to compare the shopper-specific rankings of the plurality of earn categories and the discount reward specified by the shopper to the offer bank of pairs of earn requirements and corresponding discount rewards to generate a list of the plurality of earn requirements associated with the discount reward specified by the shopper.

The shopper reward module may filter the shopper-specific rankings of the plurality of earn categories based on historical discount reward selection preferences of the shopper prior to comparing the shopper-specific rankings of the plurality of earn categories to the offer bank of pairs of earn requirements and corresponding discount rewards.

The shopper reward module may allow selection by the shopper of one of the plurality of earn requirements from the list of the plurality of earn requirements associated with the discount reward specified by the shopper.

The database may include a rewards repository for each of the plurality of shoppers, and wherein the shopper reward module may monitor purchases made by the shopper following selection by the shopper of the one of the plurality of earn requirements, and add the discount reward specified by the shopper to the shopper's rewards repository when the shopper satisfies the one of the plurality of earn requirements.

The purchase interface may comprise a point-of-sale terminal communicatively coupled to the communication module. Alternatively or additionally, the purchase interface may comprise a web-based product purchase interface hosted by the shopper reward server.

A method may comprise receiving purchase transaction data from a plurality of purchase interfaces of a retail enterprise, the purchase transaction data relating to items purchased by shoppers during purchase transactions carried out via the plurality of purchase interfaces, storing the purchase transaction data for the plurality of shoppers in a corresponding plurality of shopper purchase histories contained in a database such that each of the plurality of shopper purchase histories includes purchase transaction data for item purchases made over time by a different one of the plurality of shoppers, and selectively generating for any of the plurality of shoppers at least one earn requirement, based on that shopper's one of the plurality of shopper purchase histories, that must be satisfied by the shopper via at least one purchase made via any of the plurality of purchase interfaces in order to earn a corresponding discount reward redeemable against at least one specified item via any of the plurality of purchase interfaces.

The method may further comprise monitoring purchases made by the shopper following selection by the shopper of the earn requirement and the corresponding discount reward, and adding the discount reward to a rewards repository associated with the shopper in the database when the shopper satisfies the earn requirement. Adding the discount reward to a rewards repository may comprise adding the discount reward to the rewards repository associated with the shopper only if the shopper satisfies the earn requirement within a specified earn time period following selection by the shopper of the earn requirement and corresponding discount reward. The method may further comprise allowing redemption of the discount reward against the at least one item only if the discount reward is redeemed against the at least one item within a reward redemption time period following addition of the discount reward to the rewards repository.

The method may further comprise selectively generating the at least one earn requirement based on the shopper's one of the plurality of shopper purchase histories and also on the plurality of shopper purchase histories.

The method may further comprise generating a plurality of different pairs of earn requirements and corresponding discount rewards, based on the shopper's one of the plurality of shopper histories, and allowing selection by the shopper of one of the plurality of different, earn requirements to satisfy in order to earn the corresponding discount reward.

The method may further comprise allowing the shopper to specify the discount reward, wherein selectively generating the at least one earn requirement comprises generating the at least one earn requirement, based on the shopper's one of the plurality of shopper purchase histories, that must be satisfied by the shopper via at least one purchase made via any of the plurality of purchase interfaces in order to earn the specified discount reward.

Generating the at least one earn requirement may comprise generating a plurality of different earn requirements, based on the shopper's one of the plurality of shopper purchase histories, that must each be satisfied by the shopper via at least one purchase made via any of the plurality of purchase interfaces in order to earn the specified discount reward, the method further comprising allowing selection by the shopper of one of the plurality of different earn requirements to satisfy in order to earn the specified discount reward.

One or more computer readable media may contain instructions for hosting a shopper reward program via a network, wherein execution of the instructions by one or more processors of a computing device may cause the one or more processors to receive purchase transaction data from a plurality of purchase interfaces of a retail enterprise, the purchase transaction data relating to items purchased by shoppers during purchase transactions carried out via the plurality of purchase interfaces, store the purchase transaction data for the plurality of shoppers in a corresponding plurality of shopper purchase histories contained in a database such that each of the plurality of shopper purchase histories includes purchase transaction data for item purchases made over time by a different one of the plurality of shoppers, and selectively generate for any of the plurality of shoppers at least one earn requirement, based on that shopper's one of the plurality of shopper purchase histories, that must be satisfied by the shopper via at least one purchase made via any of the plurality of purchase interfaces in order to earn a corresponding discount reward redeemable against at least one specified item via any of the plurality of purchase interfaces.

Execution of the instructions may further cause the one or more processors to monitor purchases made by the shopper following selection by the shopper of the earn requirement and the corresponding discount reward, and add the discount reward to a rewards repository associated with the shopper in the database when the shopper satisfies the earn requirement.

Execution of the instructions may further cause the one or more processors to add the discount reward to the rewards repository associated with the shopper only if the shopper satisfies the earn requirement within a specified earn time period following selection by the shopper of the earn requirement and corresponding discount reward.

Execution of the instructions may further cause the one or more processors to allow redemption of the discount reward against the at least one item only if the discount reward is redeemed against the at least one item within a reward redemption time period following addition of the discount reward to the rewards repository.

Execution of the instructions may further cause the one or more processors to selectively generate the at least one earn requirement based on the shopper's one of the plurality of shopper purchase histories and also on the plurality of shopper purchase histories.

Execution of the instructions may further cause the one or more processors to generate a plurality of different pairs of earn requirements and corresponding discount rewards, based on the shopper's one of the plurality of shopper histories, and allow selection by the shopper of one of the plurality of different earn requirements to satisfy in order to earn the corresponding discount reward.

Execution of the instructions may further cause the one or more processors to allow the shopper to specify the discount reward, and to selectively generate the at least one earn requirement, based on the shopper's one of the plurality of shopper purchase histories, that must be satisfied by the shopper via at least one purchase made via any of the plurality of purchase interfaces in order to earn the specified discount reward.

Execution of the instructions may further cause the one or more processors to generate the plurality of different earn requirements, based on the shopper's one of the plurality of shopper purchase histories, that must each be satisfied by the shopper via at least one purchase made via any of the plurality of purchase interfaces in order to earn the specified discount reward, and to allow selection by the shopper of one of the plurality of different earn requirements to satisfy in order to earn the specified discount reward.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

FIG. 2 is a simplified block diagram of an embodiment of one of the point-of-sale systems illustrated in FIG. 1.

FIG. 3A is a simplified block diagram of an embodiment of one of the mobile communication devices illustrated in FIG. 1.

FIG. 3B is a simplified block diagram of an embodiment of one of the user computing devices illustrated in FIG. 1.

DETAILED DESCRIPTION OF THE DRAWINGS

Figure 1:
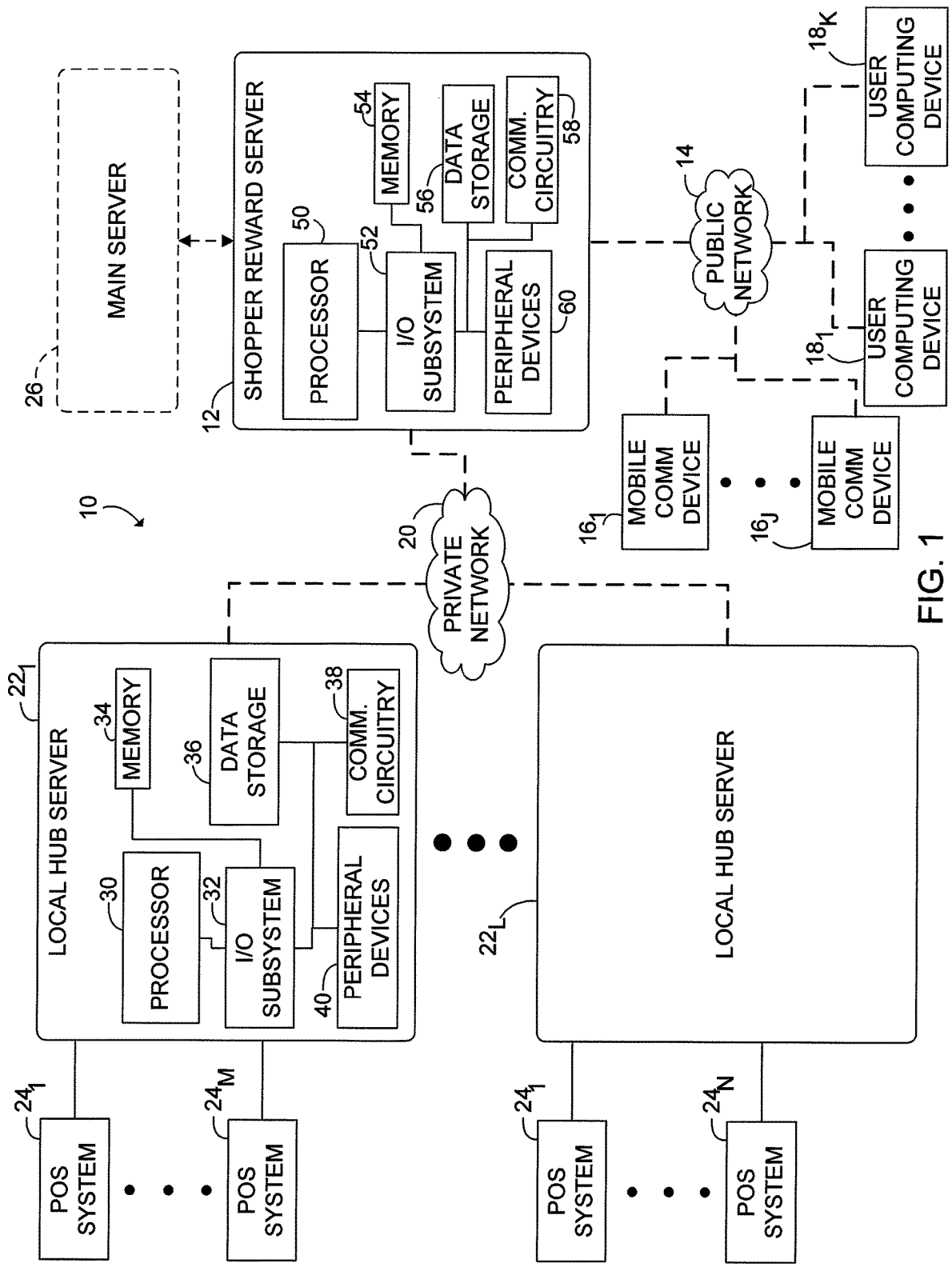
FIG. 1 is a simplified block diagram of an embodiment of system or providing customers of a retail enterprise with earnable rewards.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more machine-readable media, which may be read and executed by one or more processors. A machine-readable medium may be embodied as any device or physical structure for storing or transmitting information in a form readable by a machine (e.g., a computing device). For example, a machine-readable medium may be embodied as any one or combination of read only memory (ROM); random access memory (RAM); magnetic disk storage media; optical storage media; flash memory devices; and others.

Referring now to FIG. 1, a system 10 is shown for providing customers of a retail enterprise with earn able rewards. The system 10 includes a shopper reward server 12 configured to communicate with shoppers via a public network 14, e.g., the Internet, and shoppers may access the public network 14 using any conventional public network accessible electronic device and/or system. In the illustrated embodiment, for example a number, J, of mobile communication devices $16_1$-$16_J$, and a number, K, of computing devices $18_1$-$18_K$, are shown. Each is configured to communicatively connect to the public network 14, and J and K may each be any positive integer. The shopper rewards server 12 is further configured to communicate with a number of point-of-sale systems $24_1$-$24_M$, $24_1$-$24_N$, each of which operate in a conventional manner to process items to be purchased by shoppers during purchase transactions.

The shopper reward server 12 is illustratively part of, and serves, a retail enterprise which may include any number of brick-and-mortar retail outlets each having one or more point-of-sale systems $24_1$-$24_M$, $24_1$-$24_N$ operating therein. Alternatively or additionally, the retail enterprise may control and operate a web-based purchase interface via which customers of the retail enterprise may purchase products and/or services in a conventional manner. For purposes of this document, the term "purchase interface" should be understood to refer to such a web-based purchase interface and/or to a point-of-sale system, e.g. one or more of the point-of-sale systems $24_1$-$24_M$, $24_1$-$24_N$.

As will be described in detail below, the shopper reward server 12 is illustratively configured to operate a shopper rewards program in which the shopper reward server 12 continually collects purchase transaction data for shopper members of the program, wherein such purchase transaction data relates to items purchased by the shoppers during purchase transactions carried out via the various purchase interfaces. The shopper reward server 12 constructs and periodically updates an offer bank based on the purchase transaction data for all such shopper members and also based on one or more sets of pre-established earn and reward rules. The offer bank includes a plurality of pairs of earn requirements and associated discount rewards. The earn requirements are illustratively purchase or spending requirements that must be satisfied by shoppers via at least one purchase made through any purchase interface controlled by the retail enterprise in order to earn a corresponding discount reward that is illustratively redeemable by shoppers against at least one specified item purchasable via one of the purchase interfaces.

In one embodiment, the shopper reward server 12 is configured to make available to shopper members via the public network 14 a selectable "personal rewards" feature, accessible by shopper members via a user computing device $18_1$-$18_K$ or a mobile communication device $16_1$-$16_J$, in which the shopper rewards server 12 generates a number of different earn-reward pairs, specific and tailored to the shopper accessing the feature, from the offer bank based on an analysis of the shopper's historical purchase transaction data. The shopper may then select one of the earn-reward pairs. In another embodiment, the shopper reward server 12 is configured to make available to shopper members via the public network 14 a selectable "build-your-own rewards" feature, accessible by shopper members via a user computing device $18_1$-$18_K$ or a mobile communication device $16_1$-$16_J$, in which the shopper rewards server 12 allows the shopper accessing the feature to specify a discount reward, e.g., to select a specific discount reward from a displayed list, and the shopper rewards server 12 then generates a number of different earn requirement options, specific and tailored to the shopper accessing the feature, from the offer bank based on an analysis of the shopper's historical purchase transaction data. The shopper may then select one of the earn requirement options for earning the selected discount reward. In either case, the shopper rewards server 12 is configured to track the "earn" progress by monitoring shopper spending against the selected earn requirement, and when the earn requirement is satisfied the shopper reward server 12 adds the corresponding discount coupon to a discount reward repository established in a database of the shopper reward server 12 for use by the shopper. The shopper may then redeem the discount reward against a corresponding product or service via any of the purchase interfaces.

In the embodiment illustrated in FIG. 1, the shopper reward server 12 is coupled via a private network 20 to a plurality of local hub servers $22_1$-$22_L$, where L may be any positive integer, and each local hub server $22_1$-$22_L$ is coupled to one or more of conventional point-of-sale systems, e.g., $24_1$-$24_M$, $24_1$-$24_N$. Each of the point-of-sale systems $24_1$-$24_M$, $24_1$-$24_N$ is configured to process items selected by customers for purchase and to process payment for such items. Some retail enterprises may include a single brick and mortar outlet, and other larger enterprises may include two or more physically remote brick and mortar outlets. In the latter case, the retail enterprise may include, for example, a main physical location with two or more remote physical locations, and for purposes of this document the two or remote physical locations in such an arrangement are referred to as "hub" locations. In this disclosure, the system 10 will be illustrated and described in the context of such a larger retail enterprise having a main physical location and two or more physical hub locations. In this regard, the shopper reward server 12 in the system 10 shown in FIG. 1 will typically be located at a main business location of the retail enterprise, and will be coupled via the network 20 to two or more local hub servers $22_1$-$22_L$, each of which will typically be located at a different one of the two or more hub locations.

Each hub location may include any number of point-of-sale systems coupled to a corresponding local hub server, and in the embodiment illustrated in FIG. 1, for example, the local hub server $22_1$ is communicatively coupled to "M" such point-of-sale systems $24_1$-$24_M$, where M may be any positive integer, and the local hub server $22_K$ is communicatively coupled to "N" such point-of-sale systems $24_1$-$24_N$, where N may be any positive integer and where M may or may not be equal to N. Communicative coupling between the local hub server $22_1$ and the one or more point-of-sale systems $24_1$-$24_M$, and between the local hub server $22_L$ and the one or more point-of-sale systems $22_1$-$22_N$, may be accomplished using any known communication coupling, and communications over any such hardwire and/or wireless coupling may be accomplished using any known communication protocol.

In some alternative embodiments of such a large retail enterprise, one or more of the local hub servers $22_1$-$22_L$ may be omitted, and the shopper reward server 12 may be coupled directly, via the network 20, to the one or more point-of-sale systems $24_1$-$24_M$, $24_1$-$24_N$, or the shopper reward server 12 may be omitted and at least one of the local hub servers $22_1$-$22_L$ may be configured to act as a so-called master server with the remaining local hub servers $22_1$-$22_L$ configured to act as so-called slave servers. In other alternative embodiments in which the retail enterprise includes only a single brick and mortar outlet, the local hub servers $22_1$-$22_L$ may be or include the shopper reward server 12 or vice versa. For purposes of the following description, any process disclosed as being controlled by the shopper reward server 12 may, in some embodiments, instead be controlled, in whole or in part, by one or more local hub servers $22_1$-$22_L$ and vice versa, and/or may be controlled, in whole or in part, by one of the point-of-sale systems $24_1$-$24_M$, $24_1$-$24_N$ and vice versa.

The local hub server $22_1$ may be embodied as any type of server (e.g., a web server) or similar computing device capable of performing the functions described herein. In the illustrative embodiment of FIG. 1, the local hub server $22_1$ includes a processor 30, an I/O subsystem 32, a memory 34, a data storage 36, a communication circuitry 38, and one or more peripheral devices 40. It should be appreciated that the local hub server $22_1$ may include other components, subcomponents, and devices commonly found in a sever and/or computing device, which are not illustrated in FIG. 1 for clarity of the description.

The processor 30 of the local hub server $22_1$ may be embodied as any type of processor capable of executing software/firmware, such as a microprocessor, digital signal processor, microcontroller, or, the like. The processor 30 may be a single processor or include multiple processors. The I/O subsystem 32 of the local hub server $22_1$ may be embodied as circuitry and/or components to facilitate input/output operations with the processor 30 and/or other components of the local hub server $22_1$. The processor 30 is communicatively coupled to the I/O subsystem 32.

The memory 34 of the user local hub server 104 may be embodied as or otherwise include one or more conventional volatile and/or non-volatile memory devices. The memory 34 is communicatively coupled to the I/O subsystem 32 via a number of signal paths. Although only a single memory device 34 is illustrated in FIG. 1, the local hub server $22_1$ may include additional memory devices in other embodiments. Various data and software may be stored in the memory 34. The data storage 36 is also communicatively coupled to the I/O subsystem 32 via a number of signal paths, and may be embodied as any typo of device or devices configured for the short-term or long-term storage of data such as, for example, memory devices and circuits, memory cards, hard disk drives, solid-state drives, or other data storage devices.

The communication circuitry 38 of the local hub server $22_1$ may include any number of devices and circuitry for enabling communications between the local hub sever $22_1$ and the shopper reward server 12 and between the local hub server $22_1$ and the one or more point-of-sale systems $24_1$-$24_M$. In the illustrated embodiment, for example, communication between the local hub server $22_1$ and the shopper reward server 12 takes place wirelessly via the network 20, wherein the network 20 may represent, for example, a private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the local hub server $22_1$ and the shopper reward server 12 may be a non-private network and/or may be, in whole or in part, a wired connection. Generally, the communication circuitry 38 may be configured to use any one or more, or combination, of conventional secure and/or unsecure communication protocols to communicate with the shopper reward server 12. As such, the network 20 may include any number of additional devices, such as additional computers, routers, and switches, to facilitate communications between the local hub server $22_1$ and the shopper reward server 12. Communication between the local hub server $22_1$ and the one or more point-of-sale systems $24_1$-$24_M$, $24_1$-$24_N$ may take place via one or more conventional wired or wireless communication interfaces.

In some embodiments, the local hub server $22_1$ may also include one or more peripheral devices 40. Such peripheral devices 40 may include any number of additional input/output devices, interface devices, and/or other peripheral devices. For example, the peripheral devices 40 may include a display, a keyboard, a mouse, audio processing circuitry, and/or other input/output devices.

The local hub server $22_L$ may be substantially similar to the local hub server $22_1$ and include similar components. As such, the description provided above of the components of the local hub server $22_1$ may be equally applicable to such similar components of the local hub server $22_L$ and are not repeated herein so as not to obscure the present disclosure. Of course, it should be appreciated that in some embodiments one or more of the local hub servers $22_1$-$22_L$ and may be dissimilar to others of the local hub servers $22_1$-$22_L$.

An embodiment of the shopper reward server 12 is also illustrated in FIG. 1, and generally includes the same components as the local hub server $22_1$. For example, a processor 50 is coupled to an I/O subsystem 52, and the I/O subsystem 52 is coupled to a memory 54, a data storage unit 56, communication circuitry 58 and one or more peripheral devices 60. In some embodiments, each of the foregoing components may be identical to corresponding components of the local hub server $22_1$ described above, and a detailed explanation of such components will not be repeated here for brevity. In other embodiments, the shopper reward server 12 may be configured differently than the local hub server $22_1$ described above. In any case, the communication circuitry 38 of each of the local hub servers $22_1$-$22_L$ facilitates communication with the communication circuitry 58 of the shopper reward server 12 and vice versa so that information can be shared between the shopper reward server 12 and each of the one or more local hub servers $22_1$-$22_L$ via the network 20. Although only one such shopper reward server 12 is shown in FIG. 1, it should be appreciated that, in other embodiments, the system 10 may include any number of shopper reward servers, and in still other embodiments the shopper reward server 12 may be communicatively coupled to a shopper reward server 26 of the retail enterprise as shown by dashed-line representation in FIG. 1. In any case, the shopper reward server 12 may be embodied as any type of server (e.g., a web server) or similar computing device capable of performing the functions described herein.

The mobile communication devices $16_1$-$16_J$ illustrated in FIG. 1 are intended to depict mobile communication devices that are each separately owned and/or operated by a different shopper. No limit on the total number of such mobile communication devices that may be owned and operated by any one shopper, or on the total number of such mobile communication devices that may communicate with the shopper reward server 12, is intended or should be inferred. The mobile communication devices $16_1$-$16_J$ may be or include any mobile electronic device capable of executing one or more software application programs and of communicating with the shopper reward server 12 via the public network 14. Examples of the mobile communication devices $16_1$-$16_J$ include, but should not be limited to, mobile telephones, smart phones, tablet computers, personal data assistants (PDAs), and the like.

The user computing devices $18_1$-$18_L$ illustrated in FIG. 1 are intended to include any of privately owned and accessed computers, such as those residing in shopper's residences, to include semi-privately owned and accessed computers, such as those residing at multiple-employee business enterprises, and publicly accessible computers, such as those available at internet cafés and kiosks. The user computing devices $18_1$-$18_L$ may be or include any computer capable of executing one or more software programs and of communicating with the shopper reward server 12 via the public network 14. Examples of the user computing devices $18_1$-$18_L$ include, but should not be limited to, personal computers (PCs), laptop computers, notebook computers and the like, whether or not networked with one or more other computing devices.

Referring now to FIG. 2, an embodiment 24 of one of the one or more point-of-sale systems, $24_1$-$24_M$, $24_1$-$24_N$, is shown which includes components similar to the shopper reward server 12 and also to the one or more local hub servers $22_1$-$22_L$, such as a processor 200, an I/O subsystem 204, a memory 202, a data storage device 206, communication circuitry 208 and a number of peripheral devices 210. In some embodiments, each of the foregoing components may be identical to corresponding components of the local hub server $22_1$ described above, and a detailed explanation of such components will not be repeated here for brevity. In other embodiments, any of the one or more point-of-sale systems $24_1$-$24_M$, $24_1$-$24_N$ may be configured differently than the local hub server $22_1$ described above. Additionally, the illustrated point-of-sale system 24 includes one or more actuators 226 and hardware infrastructure 228, examples of which will be described below. It will be appreciated that the point-of-sale system 24 may include other components, sub-components, and devices commonly found in a computer and/or computing device. In any case, the communication circuitry 208 is configured to facilitate communication with a corresponding one of the local hub servers $22_1$-$22_L$ and the point-of-sale system 24 may use any suitable communication protocol to communicate with the corresponding local hub server $22_1$-$22_L$.

In addition to, or alternatively to, the number of peripheral devices 40 of the local hub server $22_1$ described above, the number of peripheral devices 210 of the point-of-sale system 24 may include any number of other peripheral or interface devices. Examples of some of the peripheral devices 210 illustrated in FIG. 2 include, but should not be limited to, one or more conventional payment interfaces 214, one or more conventional item price scanners 216, one or more conventional display monitors 218, one or more conventional produce scales 220 and one or more conventional controllers 224 for controlling one or more conventional actuators 226 associated with the operation of the point-of-sale system 24. The one or more payment interfaces 214 are provided, e.g., to facilitate receipt of credit/debit card and/or other form of payment from customers (shoppers), and each such interface 214 may illustratively include one or more of a display, a touch screen, a keyboard, a mouse, external speakers, and/or other peripheral devices. One or more of the payment interfaces 214 may further include a produce scale 220, and one or more produce scales 220 may alternatively be coupled to the point-of-sale system 24 separately from the one or more customer payment interfaces 214. The one or more item scanner(s) 216 is/are configured to scan price code labels or other such indicators for items being purchased by customers and to also scan print media coupons.

The one or more display monitor(s) 218 provide item and/or pricing information to customers and/or enterprise employees, and may further provide additional information regarding cost and/or discounts for one or more items being purchased as well as information regarding discounts realized by customers through the use of print media and/or virtual coupons. The peripheral devices 212 of the point-of-sale system 110 may further optionally include a near-field communication device 222, as illustrated in dashed-line configuration in FIG. 2, which may be included in embodiments in which one or more of the mobile communication devices $16_1$-$16_J$ also has such a near-field communication device such that customer information, e.g., customer identification information in the form of one or more identification codes, user names, passwords, or the like, can be transferred from such one or more of the mobile communication devices $16_1$-$16_J$ to the point-of-sale system 24 by tapping the two near-field communication devices together or by passing the near-field communication device of a so-equipped mobile communication device $16_1$-$16_J$ sufficiently close to the near-field communication device 222 to effectuate such communication. In other embodiments, customers can transfer customer identification information to the point-of-sale system 24 via the payment interface 214, item scanner 21 or other peripheral device.

The point-of-sale system 24 further includes hardware infrastructure 228 which forms the structural backbone of the point-of-sale system 24. Examples of structural components that may be included in the hardware infrastructure 228 include, but should not be limited to, one or more purchased item transport units, e.g., one or more purchased item conveyance units or systems, one or more conventional purchased item bagging areas, e.g., one or more conventional item bagging carousals, one or more purchased item support units, and the like. The one or more actuators 226 may be or include any actuator that is controllable by at least one of the one or more conventional controllers 224, and which may facilitate operation and/or control of the hardware infrastructure of the point-of-sale system 24. Examples of such one or more actuators may include, but should not be limited to; one or more linear and/or rotational drive motors, one or more electronically controlled switches, and the like.

Referring now to FIG. 3A, an embodiment of one of the mobile communication devices 16 illustrated in FIG. 1 is shown, which includes components similar to the shopper reward server 12 and also to the one or more local hub servers $22_1$-$22_L$, such as a processor 300, an I/O subsystem 302, a memory 304, a data storage device 306, communication circuitry 308 and a number of peripheral devices 310. In some embodiments, each of the foregoing components may be identical to corresponding components of the local hub server $22_1$ described above, and a detailed explanation of such components will not be repeated here for brevity. In other embodiments, any of the one or more mobile communication devices $16_1$-$16_J$ may be configured differently than the local hub server $22_1$ described above. It will be appreciated that the mobile communication device 16 may include other components, sub-components, and devices commonly found in a computer and/or computing device. In any case, the communication circuitry 308 illustratively includes conventional wireless communication circuitry 310 configured to facilitate communication with the shopper reward server 12 via the network 14, and the mobile communication device 16 may use any suitable communication protocol to communicate with the corresponding shopper reward server 12. The communication circuitry 308 of the mobile communication device 16 may further optionally include conventional contact-less communication circuitry 314, which may include a conventional near-field communication device 316, as illustrated by dashed-line representation in FIG. 3A. The near-field communication device 316 may be included, for example, in embodiments in which one or more of the point-of-sale systems $24_1$-$24_M$, $24_1$-$24_N$ also has/have such a near-field communication device 222 such that customer information, e.g., customer identification information in the form of one or more identification codes, user names, passwords, or the like, can be transferred from the mobile communication device 16 to such one or more point-of-sale systems $24_1$-$24_M$, $24_1$-$24_N$ by tapping the two near-field communication devices together or by passing the near-field communication device of the mobile communication device 16 sufficiently close to the near-field communication device 222 to effectuate such communication. In addition to, or alternatively to, the number of peripheral devices 40 of the local hub server $22_1$ described above, the number of peripheral devices 310 of the mobile communication device 16 may include any number of other or additional peripheral or interface devices. One example of such an additional peripheral device illustrated in FIG. 3A includes, but should not be limited to, a conventional visual display unit 318.

Referring now to FIG. 3B, an embodiment of one of the user computing devices 18 illustrated in FIG. 1 is shown, which includes components similar to the shopper reward server 12 and also to the one or more local hub servers $22_1$-$22_L$ such as a processor 350, an I/O subsystem 352, a memory 354, a data storage device 356 communication circuitry 358 and a number of peripheral devices 360. In some embodiments, each of the foregoing components may be identical to corresponding components of the local hub server $22_1$ described above, and a detailed explanation of such components will not be repeated here for brevity. In other embodiments, any of the one or more user computing devices $18_1$-$18_K$ may be configured differently than the local hub server $22_1$ described above. It will be appreciated that the user computing device 18 may include other components, sub-components, and devices commonly found in a computer and/or computing device. In any case, the communication circuitry 358 illustratively includes conventional wireless communication circuitry 362 configured to facilitate communication with the shopper reward server 12 via the network 14, and the user comp ting device 18 may use any suitable communication protocol to communicate with the corresponding shopper reward server 12. In addition to, or alternatively to, the number of peripheral devices 40 of the local hub server 22₁ described above, the number of peripheral devices 360 of the user computing device 18 may include any number of other or additional peripheral or interface devices. One example of such an additional peripheral device illustrated in FIG. 38 includes, but should not be limited to, a conventional visual display unit 364.

Figure 4:
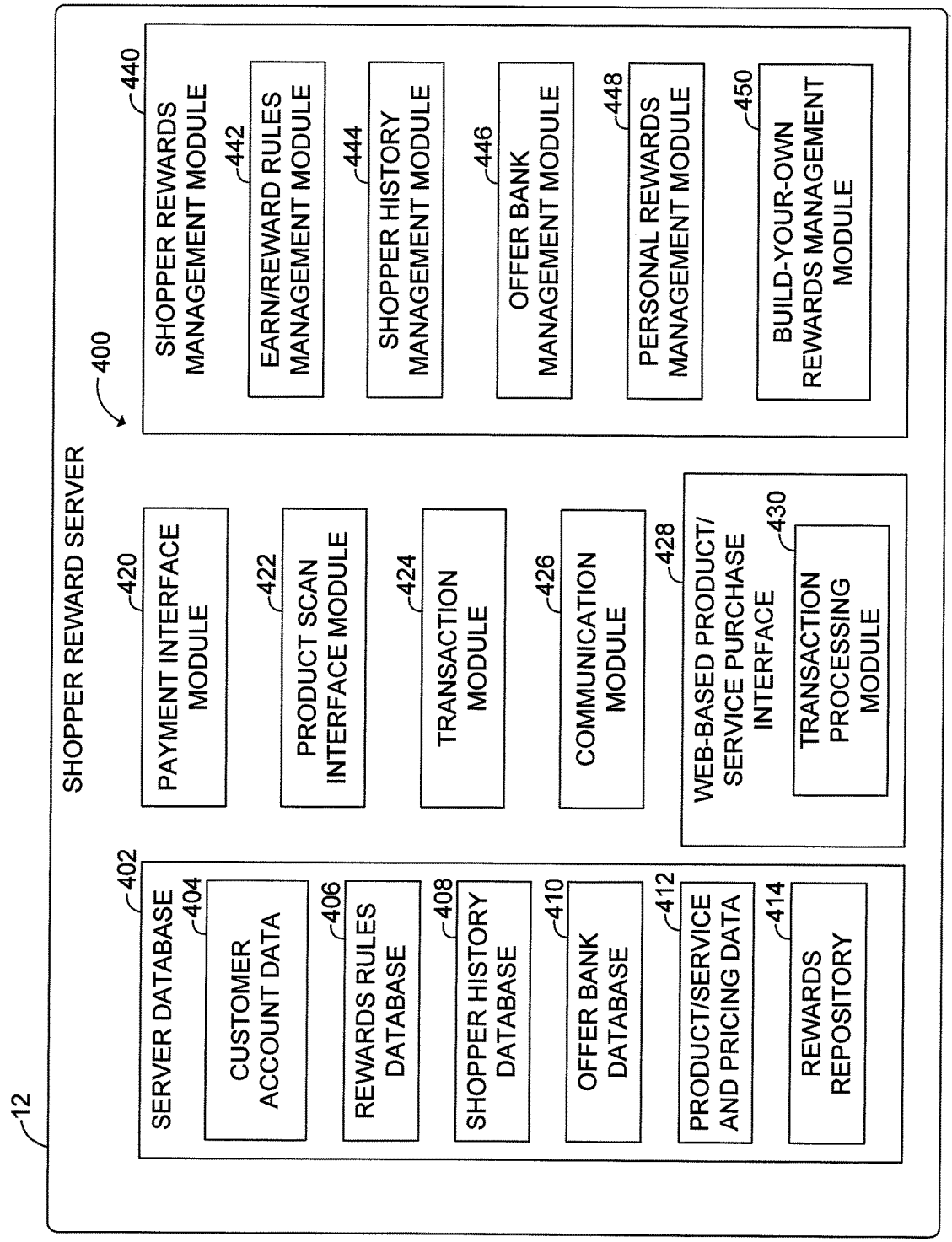
FIG. 4 is a simplified block diagram of an embodiment of a software environment of the shopper reward server of FIG. 1.

Referring now to FIG. 4, a simplified block diagram is shown of an embodiment of an environment 400 of the shopper reward server 12 illustrated in FIG. 1. In the illustrated embodiment, the environment 400 includes a server database 402 which includes customer account data 404, a rewards rules database 406, a shopper history database 408, an offer bank database 410, product and pricing data 412 and a rewards repository 414.

The shopper reward server 12 provides, stores and manages shopper rewards for one or more shoppers. Shoppers may elect to participate in the shopper services/rewards program by establishing a user account within the server 12, which user account may in some cases be an individual account accessible only by an individual person, e.g., an individual shopper, and in other cases may be a group or "household" account accessible by each of a plurality of members of a predefined group of persons, e.g., members of a family or household, one or more employees of a business enterprise, etc. The terms "shopper," "member," "shopper member," "customer" and "household," and variants thereof, are used interchangeably in the following description, and such terms should be understood to refer interchangeably to an individual shopper or a predefined group of individual shoppers (referred to herein as a "household") who shop at and purchase items from a retail enterprise, and who are active members of a shopper reward program of the type described herein and provided and managed by the retail enterprise.

Illustratively, a software application program is available for download from the shopper reward server 12 via the public network 14 for shoppers electing to access the shopper services/rewards program via their mobile communication device, e.g., one of the mobile communication devices 16₁-16ⱼ. Once downloaded and activated, shoppers can access and manage their shopper rewards program account and program features via the software application program executed by their mobile communication device 16₁-16ⱼ. The shopper reward server 12 alternatively or additionally hosts and controls a shopper rewards program website accessible via the public network 14, and in such embodiments shoppers can access and manage their shopper rewards program account and program features by accessing the shopper reward server 12 via a computing device 18₁-18_L and/or via their mobile communication device 16₁-16ⱼ if the latter is equipped with a web browser.

In the illustrated embodiment, the customer account data 404 of the server database 402 has stored therein information relating to user accounts and profile data for each of the members of the shopper rewards program. As shoppers join the shopper rewards program, the server 12 assigns corresponding member identification (ID) and such member ID and other profile information entered into the server 12 is stored along with the member ID information in the customer account data 404. The member ID illustratively includes or identifies a purchase tracking identifier code. The purchase tracking identifier code may be or include, for example, one or more of a shoppers ID card, an ID associated with an RFID tag, which RFID tag may be part of the NFC communication circuitry of the mobile communication device 16₁, a shoppers incentive card, or the like. Members of the shopper rewards program described herein will typically scan or otherwise communicate, at least one of the above-described purchase tracking identifier code items with one of the point-of-sale terminals 24₁-24_M (or 24₁-24_N), and it is through such a purchase tracking identifier code that the shopper reward server 12 will monitor and track purchases made by member shoppers from the retail enterprise during purchase transactions, and make available to the member shoppers the various shopper rewards described herein. All such purchase transaction data relating to items purchased by shoppers during purchase transactions carried out via one or more purchase interfaces is stored in the shopper history database 408. Illustratively, the purchase transaction data includes, but is not limited to, product/service identification information, product/service pricing, and the like.

As part of the shopper reward system described herein, the shopper rewards server 12 provides discount rewards or offers to member shoppers for one or more items purchasable from the business enterprise, e.g., in the form of one or more corresponding virtual coupons. In this regard, each member shopper is provided by the shopper rewards server 12 with access to dedicated rewards repository 414 in which such discount rewards specific to the member shopper are stored and via which the member shopper may access and redeem one or more discount rewards. In one embodiment, the server database 402 includes a plurality of rewards repositories 414; one for each of the plurality of member shoppers. Alternatively, the server database 402 may include a single rewards repository 414, and each member shopper of the shopper rewards system is provided with access to a dedicated portion of the rewards repository 414; i.e., which can be accessed by one shopper to the exclusion of all other shopper members. When a member shopper enters the member shopper's member ID into a purchase interface, e.g., into a point-of-sale system 24₁-24_M, 24₁-24_N, the processor 200 of the point-of-sale system 24₁-24_M, 24₁-24_N identifies the shopper and associates that shopper with the current purchase transaction being carried out at the point-of-sale system 24₁-24_M, 24₁-24_N. The point-of-sale system 24₁-24_M, 24₁-24_N, which is communicatively coupled to the shopper reward server 12 via a local hub server 22₁-22_L, can then access discount reward offers or coupons resident within that customer's rewards repository 414, and can thus redeem any such discount reward offer or coupon in the shoppers rewards repository 414 against a corresponding item being purchased by the member shopper in a purchase transaction. MPERKS®, a virtual customer coupon collection and redemption program offered to customers by Meijer, Inc. of Grand Rapids, Mich., is an example of one such virtual coupon storage and redemption platform that may be used with the shopper rewards program described herein, although it will be appreciated that any virtual customer coupon service which makes available to customers virtual customer coupon repositories in which virtual coupons can be stored and redeemed by customers during item purchase transactions at point-of-sale systems or terminals or web-based purchase interfaces may be alternatively be used.

The product/service and pricing data 412 contains information relating to the retail products and services sold by the retail enterprise which, the shopper reward server 12 serves, which information includes product pricing information. Illustratively, product/service pricing information is linked to product/service identification information via scan codes such that when items are scanned for purchase, the scan code of each item will identify a particular item at a particular price in the product/service and pricing database 412. The information stored in the product/service and pricing database 412 may further include any one or more of current product inventory information, product/service location within the corresponding retail outlet, past, current and future service usage and cost, past, current and future product cost and ordering information, product and service identification information, past, current and future product and service discount information, and the like.

The rewards rules database 406 has stored therein one or more rule sets for determining various earn and rewards variables used by the shopper rewards program to selectively offer pairs of earn requirements and corresponding discount rewards, and to selectively offer earn requirement options based on shopper-selected discount rewards. Examples of some such rule sets will be described in greater detail below with respect to FIG. 5.

The offer bank database 410 has stored therein an earn/reward offer bank in the form of one or more tables of earn requirements and corresponding discount rewards. The earn/reward offer bank is initially constructed based on the purchase transaction data for all shopper members of the shopper reward program at an arbitrary point in time, and is thereafter periodically updated based on purchase transaction data collected and stored in the shopper history database since previously updating the earn/reward bank.

The environment 400 of the shopper reward server 12 further includes a payment interface module 420, a product scan interface module 422, a transaction module 424, a communication module 426 and a virtual point-of-sale environment in the form of a web-based product/service purchase interface 428. The payment interface module 420 is configured, in a conventional manner, to process electronic forms of customer payment, e.g., credit card, debit card, etc., used at the point-of-sale systems $24_1$-$24_M$, $24_1$-$24_N$. The product scan interface module 422 is configured, in a conventional manner, to link item scanning activity at the point-of-sale systems $24_1$-$24_M$, $24_1$-$24_N$ to the product and pricing database 412 so that the point-of-sale systems $24_1$-$24_M$, $24_1$-$24_N$ have accesses to current item identity and pricing information for items being purchased. The communication module 426 is configured, in a conventional manner, to control and manage all communications between the shopper reward server 12 and the local hub servers $22_1$-$22_L$ in embodiments that include the local hub servers $22_1$-$22_L$, and to control and manage all communications between the shopper reward server 12 and all point-of-sale systems $24_1$-$24_M$, $24_1$-$24_N$ in embodiments that do not include a local hub server $22_1$-$22_L$.

The web-based product/service purchase interface 428 includes a transaction processing module 430 configured, in a conventional manner, to process the sale of items, e.g., products and/or services, via a web-based store or catalog (i.e., Internet-accessible web-site hosted by the server 12 of the business enterprise) by allowing customers to select items for purchase and by processing electronic forms of customer payment.

The customer payment interface 214 and item scanner 216 of the point-of-sale system 24, together with the payment interface module 420 and product scan interface module 422 of the shopper reward server 12, make up one type of customer-accessible product purchase interface in the form of a point-of-sale terminal physically located at a brick-and-mortar location of the business enterprise. The web-based product/service, purchase interface 428 makes up another type of customer-accessible product purchase interface in the form of a virtual point-of-sale environment that is accessible by customers via the Internet. In any case, the communication module 426 is configured, in a conventional manner, to control and manage all communications between the shopper reward server 12 and the local hub servers $22_1$-$22_L$ via the network 20, and to control and manage all communications between the shopper reward server 12 and the mobile communication devices $16_1$-$16_J$ and between the shopper reward server 12 and the user computing devices $18_1$-$18_K$ via the network 14.

The transaction module 426 is configured to monitor purchases of products and services made by shopper members of the shopper reward program using any of the purchase interfaces, e.g., any of the point-of-sale systems $24_1$-$24_M$, $24_1$-$24_N$, and/or the web-based product/service purchase interface 428, and to store purchase transaction data associated with such purchases in the shopper purchase history database 408. Illustratively, the shopper history database 408 is partitioned or otherwise configured to store such purchase transaction data in a manner that provides for the separate tracking and identification of at least a portion of the shopper purchase histories of each shopper for household) member and further provides for the tracking and identification of at least a portion of the shopper purchase histories of all shopper members. For example, which should not be considered to be limiting in any way, the transaction module 424 is illustratively configured in one embodiment to store the purchase transaction data in the shopper history database 408 in a manner that separately identifies and tracks identification and pricing information for each product and service purchased by each shopper, and that identifies and tracks identification and pricing information for each product and service purchased by all shoppers.

The environment 400 of the shopper reward server 12 further includes a shopper rewards management module 440, which includes an earn/reward rules management module 442, a shopper history management module 444, an offer bank management module 446, a personal rewards management module 448 and a build-your-own rewards management module 450. The earn/reward rules management module 442 is configured to provide a maintenance interface for constructing and modifying the one or more earn and rewards rule sets stored in the rewards rules database 406. An example process for implementing the earn/reward rules management module 442 will be described in detail below with respect to FIG. 5.

The shopper history management module 444 is configured to monitor the shopper purchase transaction data being stored by the transaction module 424 into the shopper history database 408 and to update total spend amounts of each shopper member, and by all shopper members, in each of a plurality of different earn categories defined by the one or more earn rule sets stored in the rewards rules database 406. An example process for implementing the transaction module 424 and the shopper history management module 444 will be described in detail below with respect to FIG. 6.

The offer bank management module 446 is configured to construct and update the offer bank stored in the offer bank database 410. An example process for implementing the offer bank management module 446 will be described in detail below with respect to FIG. 7.

The personal rewards management module 448 and the build-your-own rewards management module 450 are each configured to provide and manage a number of different shopper earn requirements and associated discount rewards, and to select such shopper earn requirements and/or discount rewards specifically for any shopper member based on the shopper member's shopper purchase history, on the shopper purchase history of all shopper members and on the one or more sets of earn/reward rules in the rewards rules database 406. As a result, such specifically tailored shopper rewards will generally be different for each shopper member, thereby creating enhanced and personal shopping incentives for each member of the program. The personal rewards management module 448, in particular, is configured to select a number of shopper earn requirements and associated discount rewards from the offer bank specifically for any shopper member based on the shopper member's shopper purchase history, on the shopper purchase history of all shopper members and on the one or more sets of earn/reward rules in the rewards rules database 406. An example process for implementing the personal rewards management module 448 will be described in detail below with respect to FIGS. 8-9. The build-your-own rewards management module 450, on the other hand, is configured to select a number of shopper earn requirements from the offer bank specifically for any shopper member based on a discount reward specified by the shopper member and further based on the shopper member's shopper purchase history, the shopper purchase history of all shopper members and on the one or more sets of earn/reward rules in the rewards rules database 406. An example process for implementing the build-your-own rewards management module 450 will be described in detail below with respect to FIGS. 10-11.

Figure 5:
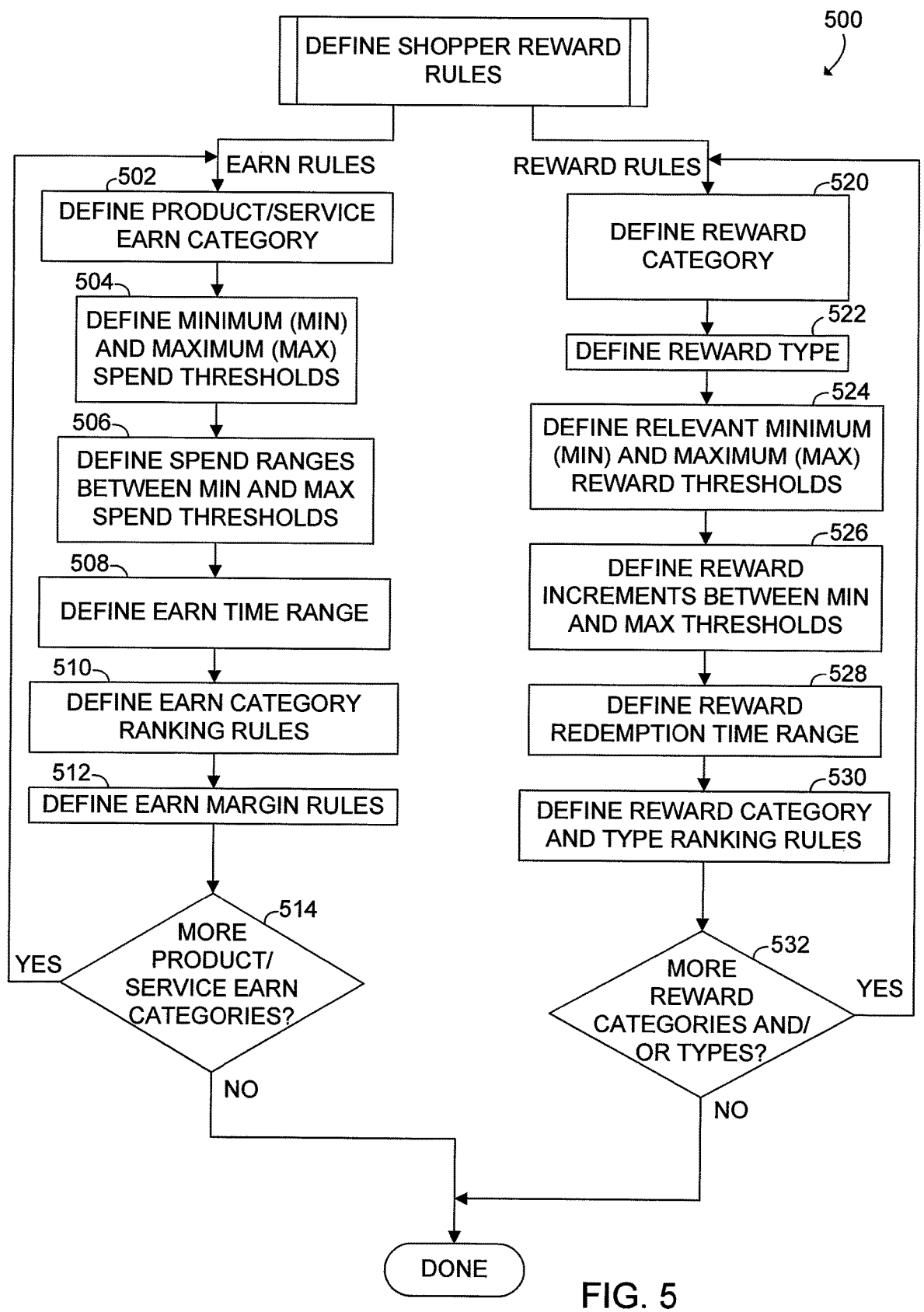
FIG. 5 is a simplified flow diagram of an embodiment of an embodiment of a process for establishing one or more rule sets for earning and receiving earnable rewards.

Referring now to FIG. 5, a simplified flow diagram is shown of a process 500 for defining and modifying one or more sets of shopper rewards rules. Illustratively, the process 500 is executed by the processor 50 of the shopper reward server 12, although this disclosure contemplates embodiments in which the process 50 is executed in whole or in part by one or more other processors communicatively coupled to the processor 50 via the communication circuitry 58 of the shopper reward server 12. For purposes of this disclosure, however, the process 500 will be described as being executed by the processor 50. Illustratively, the process 500 is initially executed in its entirety to define one or more sets of earn rules and one or more sets of reward rules, and the process 500 may thereafter be executed, in whole or in part, as needed or desired to modify one or more sets of earn rules and/or reward rules. In any case, the earn rules leg of the process 500 begins at step 502 where a plurality of product and/or service earn categories are defined. These earn categories will form a basis for defining earn requirements for the personal and build-your-own rewards, and such earn categories may define, for example, specific products and/or services, specific product and/or service groupings, specific product and/or service types, specific product and/or service business areas of the retail enterprise, all products and/or services (e.g., total spend) and the like. Some examples of earn categories may include, but should not be limited to, specific products such as eggs, milk, gasoline, toothpaste, etc., specific services such as film developing, car wash, gift wrapping, etc., specific product groupings such as picnic items, holiday decorations, etc., specific product types such as meat, paper goods, produce, dairy, men's wear, sporting goods, electronics, specific service types such as automobile services, photocopying, etc., specific product business areas such as grocery, pharmacy, clothing, sporting goods, outdoor item etc., and specific service business areas such as automotive, salon services, etc. Those skilled in the art will recognize other potential product and/or service earn categories, and any such product and/or service earn categories are contemplated by this disclosure.

The process 500 advances from step 502 to step 504 where minimum (MIN) and maximum (MAX) spend thresholds are established for each of the defined product and service earn categories. The MIN thresholds defined at step 504 establish for each earn category a minimum currency amount that must be spent by a shopper in order to earn a discount reward, and the MAX thresholds establish for each earn category a maximum currency amount that must be spent by a shopper in order to earn a discount reward. From step 504, the process 500 advances to step 506 where spend ranges between the MIN and MAX amounts of each earn category are defined. The spend ranges may form any number of spending tiers or levels between the MIN and MAX spend levels for any given earn category, and the number of spend ranges for any particular earn category may or may not depend on the difference between the MAX and MIN thresholds. For example, in some earn categories in which there is not much price difference between MIN and MAX there may be few defined spend ranges. In other earn categories in which there is not much price difference between MIN and MAX, however, there may be substantial product quality and/or consumer desirability differences which may justify several defined spend ranges despite the small difference between the MIN and MAX threshold values. Those skilled in the art will recognize other strategies for setting spend ranges between MIN and MAX spend values for various earn categories, and any such other strategies are contemplated by this disclosure.

The process 500 advances from step 506 to step 508 where earn time ranges are defined for each of the product and/or service earn categories. The earn time ranges correspond to the amount of time shopper members are allowed to satisfy a corresponding earn requirement in order to receive the associated discount reward. The earn time ranges may vary and may depend, at least in part, on the nature of the product or services in the earn categories. For example, earn requirements involving products having expiration dates may be required to be satisfied more quickly than those that do not. Those skilled in the art will recognize other strategies for setting earn time ranges for various earn categories, and any such other strategies are contemplated by this disclosure.

The process 500 advances from step 508 to step 510 where rules for ranking the various earn categories are defined. Generally, the various earn categories are ranked based on total spend amounts in each such earn category relative to the other earn categories. In one embodiment, the various earn categories are ranked twice; once with respect to total spend amounts by all of the member shoppers in each of the earn categories (a "global earn ranking"), and another time with respect to total spend amounts by the selecting shopper member (or corresponding household) in each of the earn categories (a "household earn ranking"), and in such embodiments the earn category ranking rules are different for each such ranking. In this embodiment, for example, global spending penetration (spending penetration by all of the member shoppers) in earn categories is directly proportional to the global earn ranking, whereas household spending penetration (spending penetration by only a single shopper or household) in earn categories is inversely proportional to the household earn ranking. Alternatively or additionally, the earn category ranking rules for either or both of the global earn ranking and the household earn ranking may include one or more weighting factors in one or more earn categories in which increased or decreased global or household spending is desired by the retail enterprise. Those skilled in the art will recognize other strategies for defining earn category ranking rules for either or both of the global earn ranking and the household earn ranking, and any such other strategies are contemplated by this disclosure.

The process 500 advances from step 510 to step 512 where earn margin rules are defined. Generally, the earn margin rules define an incremental spend range increase for each earn category, and therefore the earn margin rule for any particular earn category will typically be an integer value. The earn margin rules for any particular earn category are generally a function of the total number of spend ranges for the earn category. As an example, a particular earn category may define five spend ranges between the MIN and MAX spend thresholds for the earn category, and the earn margin rules for such an earn category may define an earn margin of 2 for the two lowest spend ranges, and an earn margin of 1 for the top three spend ranges. As will be described in further detail below with respect to FIG. 7 the earn margin for any particular earn category will ultimately dictate how much more a shopper will be required to spend in that earn category in order to earn an associated discount reward. In any case, those skilled in the art will recognize other strategies for defining earn margin rules for the various earn categories, and any such other strategies are contemplated by this disclosure.

The process 500 advances from step 512 to step 514 where the processor 50 determines whether there are additional product and/or service earn categories to define and, if so, the process 500 loops back to step 502. Otherwise, the process 500 advances to DONE.

The reward rules leg of the process 500 begins at step 520 where a plurality of reward categories are defined. These reward categories will form a basis for defining discount rewards for the personal rewards and for listing selectable discount rewards for the build-your-own rewards and, like the earn categories, such reward categories may define specific products and/or services, specific product and/or service groupings, specific product and/or service types, specific product and/or service business areas of the retail enterprise, all products and/or services (e.g., total spend) and the like. The example earn categories described above likewise serve as example reward categories, although it will be understood that this disclosure contemplates other reward categories that do not appear in this list of examples. In any case, the process 500 advances from step 520 to step 522 where a plurality of reward types are defined. These reward types define specific forms in which the reward category may be implemented, and each reward category may have one or several different associated reward type options. Some examples of reward types may include, but should not be limited to, free products or services, a specified monetary discount on the purchase of specific products or services, specific product and/or service groupings, specific product and/or service types, specific product and/or service business areas of the retail enterprise, or all products and/or services (e.g., total spend), a specified percentage discount off the price of specific products or services, specific product and/or service groupings, specific product and/or service types, specific product and/or service business areas of the retail enterprise, or all products and/or services (e.g., total spend), etc. Those skilled in the art will recognize other strategies for defining reward types for the various reward categories, and any such other strategies are contemplated by this disclosure.

The process 500 advances from step 522 to step 524 where minimum (MIN) and maximum (MAX) reward thresholds are established for each of the defined product and service reward categories. The MIN thresholds defined at step 524 establish for each reward type of each reward category a minimum reward type, e.g., minimum discount amount, minimum number of free items, etc., for that reward type, and the MAX thresholds establish for each reward type of each reward category a maximum reward type, e.g., maximum discount amount, maximum number of free items, etc., for that reward type. From step 524, the process 500 advances to step 526 where reward increments between the MIN and MAX reward thresholds of each reward type of each reward category are defined. Generally, the reward increments may be linear or non-linear within any reward type. Those skilled in the art will recognize various strategies for defining reward increments between the MIN and MAX reward thresholds for the reward types of each of the reward categories, and any such strategies are contemplated by this disclosure.

The process 500 advances from step 526 to step 528 where reward redemption time ranges are defined for each of the product and/or service reward categories. The reward redemption time ranges correspond to the amount of time shopper members are allowed between the time of receipt and subsequent redemption of a discount reward. The reward time ranges may vary and may depend, at least in part, on the nature of the product or services in the reward categories. For example, discount rewards involving seasonal products may be required to be redeemed more quickly than those that are not. Those skilled in the art will recognize other strategies for defining reward redemption time ranges for various reward categories, and any such other strategies are contemplated by this disclosure.

The process 500 advances from step 528 to step 530 where rules for ranking the various reward categories and types are defined. Generally, the various reward categories and types are ranked based on a number of different factors relating to reward desirability and/or shopper engagement. In one embodiment, the various reward categories and types are ranked twice; once with respect to the total number of member shoppers (a "global reward ranking"), and another time with respect to the selecting shopper member or corresponding household (a "household reward ranking"), and in such embodiments the reward category and type ranking rules are different for each such ranking. In this embodiment, for example, global reward rankings may take into account primarily the popularity of the various reward categories and reward types relative to the other reward categories and type such that the global reward rankings are directly proportional to the popularity of the corresponding reward categories or types. Household reward rankings, on the other hand, may take into account primarily the relative engagement of the shopper or household with the retail enterprise such that shopper or household reward rankings are inversely proportional to the relative engagement of the shopper or household so that higher value discount rewards are offered to lesser engaged shoppers or households to thereby provide an incentive for the shopper or household to become more highly engaged with the retail enterprise. Alternatively or additionally, the reward category and type ranking rules may take into account for either the global reward rankings or the household reward rankings, either positively or negatively, any one or more of the relative engagement of the shopper or household with the retail enterprise, relative spending activity with the reward category, cost of the reward category and/or type to the retail enterprise, perceived value of the reward category and/or type to the shopper or shoppers and the total number of discount rewards selected but not yet earned or earned but not yet redeemed in any one or more of the reward categories. Those skilled in the art will recognize other strategies for defining reward category ranking rules for either or both of the global reward ranking and the household reward ranking, and any such other strategies are contemplated by this disclosure.

The process 500 advances from step 512 to step 514 where the processor 50 determines whether there are additional product and/or service earn categories to define and, if so, the process 500 loops back to step 502. Otherwise, the process 500 advances to DONE.

Figure 6:
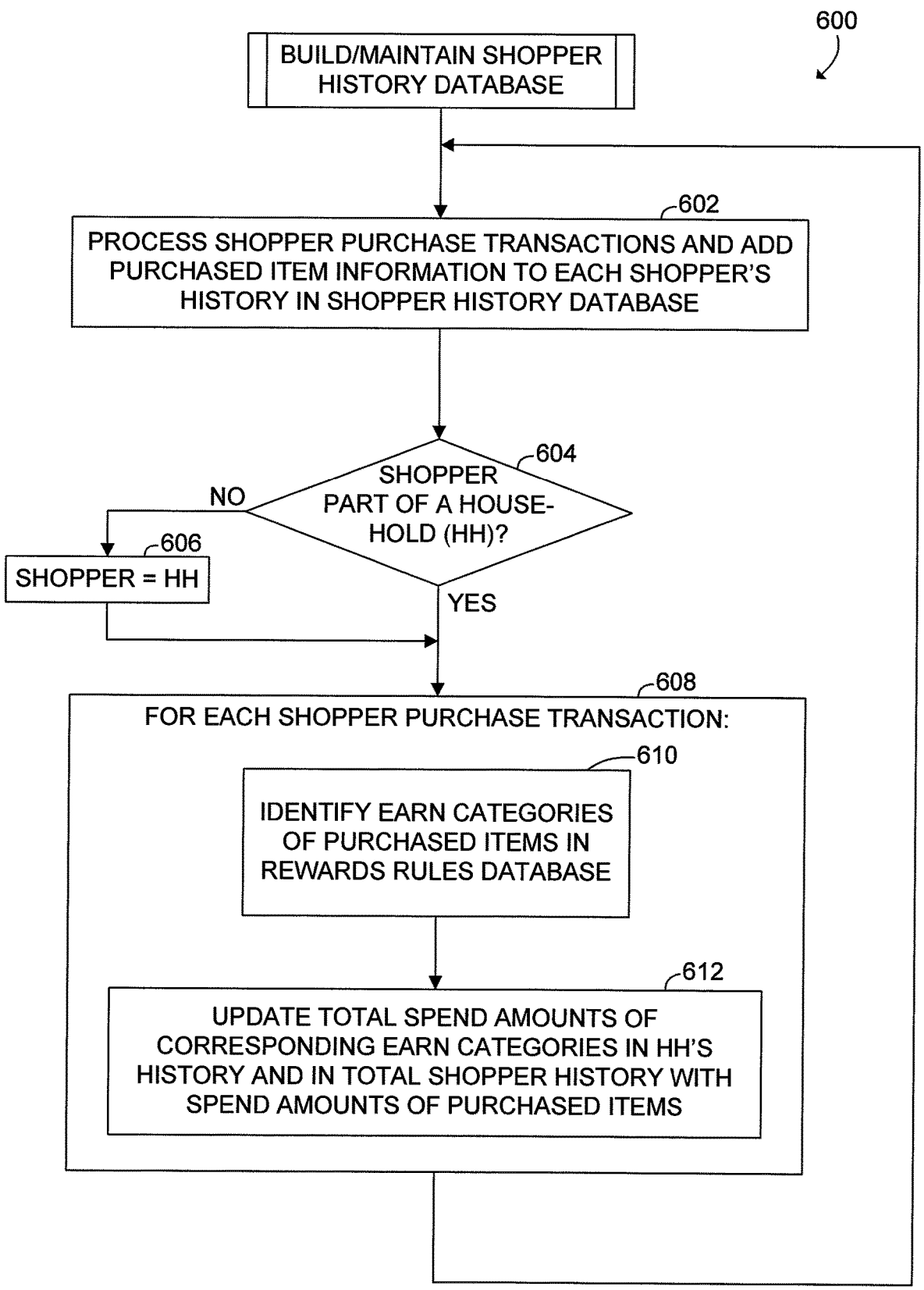
FIG. 6 is a simplified flow diagram of an embodiment of a process for building and maintaining a shopper history database.

Referring now to FIG. 6, a simplified flow diagram is shown of a process 600 for building and maintaining the shopper history database 408. Illustratively, the process 800 is executed by the processor 50 of the shopper reward server 12, although this disclosure contemplates embodiments in which the process 50 is executed in whole or in part by one or more other processors communicatively coupled to the processor 50 via the communication circuitry 58 of the shopper reward server 12. For purposes of this disclosure, however, the process 600 will be described as being executed by the processor 50. Illustratively, the process 600 is executed continually such that the contents of the shopper history database 408 is maintained current and includes the most recent shopper purchase transaction data. In any case, the process 600 begins at step 602 where the processor 50 processes shopper purchase transactions being carried out at the various point-of-sale systems $22_1$-$22_M$, $22_1$-$22_N$ and/or via the web-based product/service purchase interface 428 and adds the corresponding purchased item information, e.g., including product/service identification and pricing information, to each shopper's purchase history in the shopper history database 408. Thereafter at step 604 the processor determines whether the shopper is an individual shopper or is part of a household as this term is defined above. If the latter, the shopper is identified with the corresponding household at step 606, and in either case the process 600 advances to step 608 where the processor 50 performs the following tasks for each shopper purchase transaction: (1) at step 610, the processor 50 identifies one or more earn categories (defined in the rewards rules database 406) associated with each item in the purchase transaction, and (2) at step 612 the processor updates the total spend amounts of each of the earn categories identified in step 610 in both the shopper's (or household's (HH's)) shopper history and the total or global shopper history (i.e., the shopper history for all of the shopper members of the shopper rewards program). Following step 612, the process 600 loops back to step 602 to process another purchase transaction.

Figure 7:
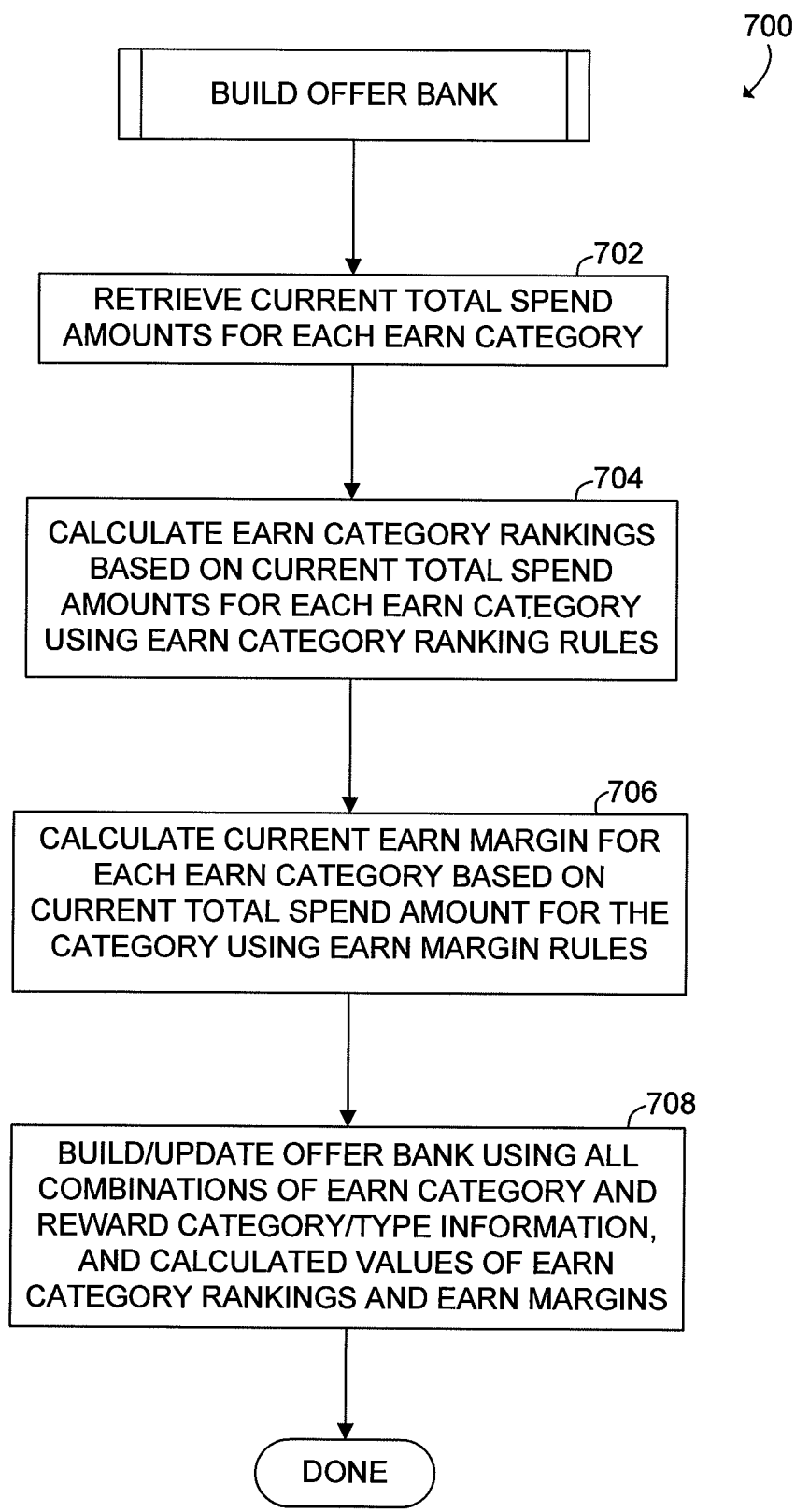
FIG. 7 is a simplified flow diagram of an embodiment of a process for constructing a bank of shopper reward offers based on the one or more sets of earn/reward rules in the rewards rules database and on the global shopper history information stored in the shopper history database.

Referring now to FIG. 7, a simplified flow diagram is shown of a process 700 for constructing a bank of shopper reward offers based on the one or more sets of earn/reward rules in the rewards rules database 406 and on the global shopper history information stored in the shopper history database 408. Illustratively, the process 700 is executed by the processor 50 of the shopper reward server 12, although this disclosure contemplates embodiments in which the process 50 is executed in whole or in part by one or more other processors communicatively coupled to the processor 50 via the communication circuitry 58 of the shopper reward server 12. For purposes of this disclosure, however, the process 700 will be described as being executed by the processor 50. Illustratively, the process 700 is executed periodically, e.g., multiple times per day, daily, weekly, etc., in order to capture and process new content that is being continually added to the shopper history database 408. In any case, the process 700 begins at step 702 where the processor 50 retrieves from the shopper history database 408 the values of the current total (i.e., global) spend amounts for each earn category defined in the rewards rules database 406. Thereafter at step 704, the processor 50 calculates earn category rankings for each of the earn categories relative to the other earn categories based on the current total spend amounts for each earn category using the earn category ranking rules defined in the rewards rules database 406. The result of step 704 will be a list of the earn categories in descending order of earn category rankings.

Following step 704, the process 700 advances to step 706 where the processor calculates a current earn margin for each earn category based on the current total spend amounts for each earn category using the earn margin rules defined in the rewards rules database 406. As described above with respect to FIG. 5, the earn margin rules illustratively define an integer number for each spend range in an earn category, and the result of step 706 for each earn category is thus the integer number associated with the spend range in which the total spend amount for earn category falls. As an example, if the total spend amount for a particular earn category places this total spend amount in the second of five spend ranges defined for the earn category, and the earn margin rule for the second spend range for the earn category is two, then the earn margin for this particular earn category is two. This means that, in order to earn a discount reward which will be subsequently associated with this earn category, a shopper will be required to spend an amount in this earn category that is at least two spend ranges above the spend range in which the current total (global) spend amount for this earn category falls.

Following step 706, the process 700 advances to step 708 where the processor 50 builds or updates an offer bank, i.e., a bank of shopper earn and reward offers, using all combinations of the earn category information defined by the reward rules database 406, the reward category information defined by the reward rules database 406 and the current values of the earn category rankings and earn margins calculated at step 704 and 706 respectively. The result of step 706 is a bank, e.g. a matrix, of shopper earn requirements and associated discount rewards ranked according to the current values of the earn category rankings which are based on the total (global) spend amounts for each earn category. The offer bank is built during the initial execution of the process 700, and is updated during each subsequent execution of the process 700.

Figure 8:
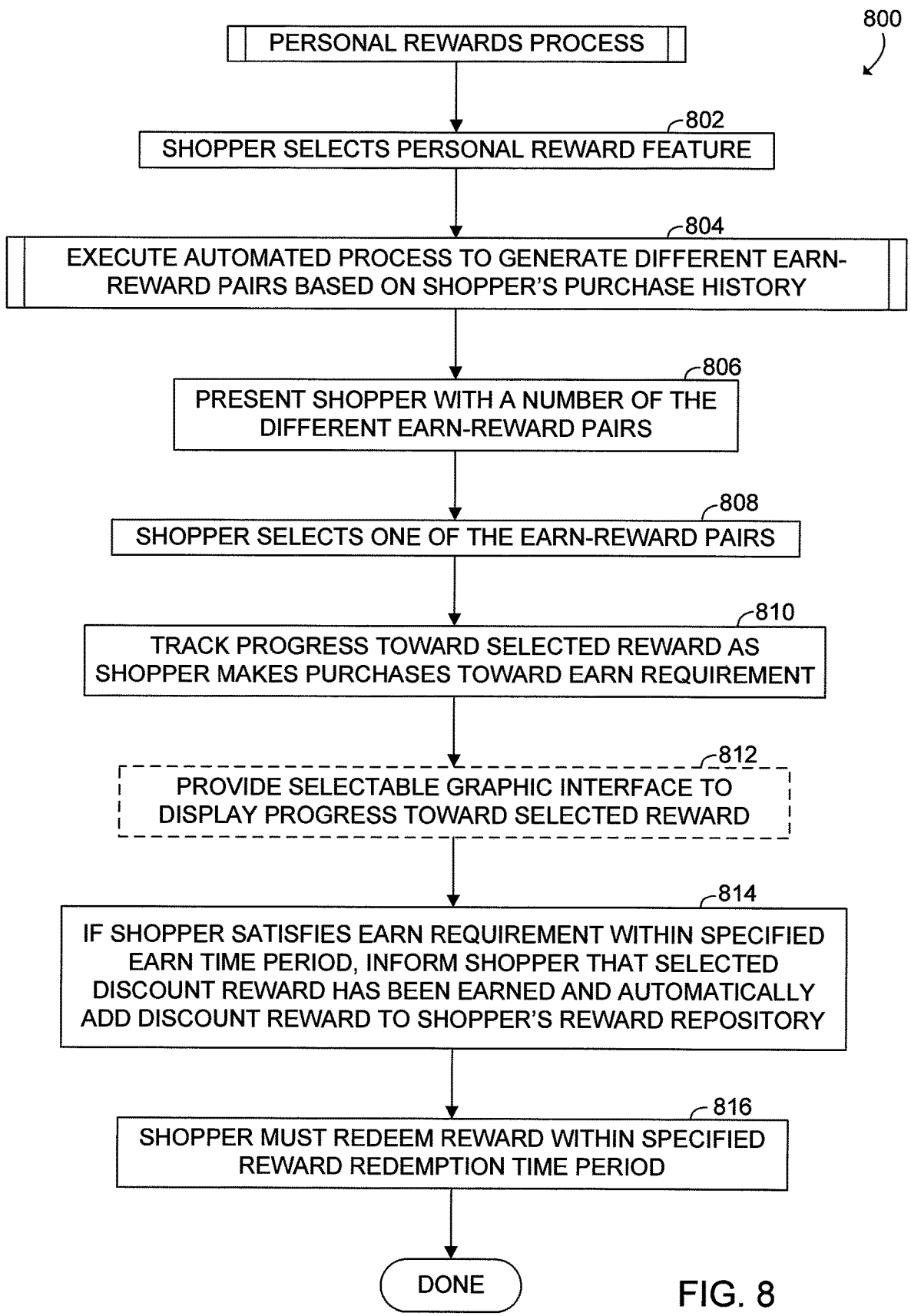
FIG. 8 is a simplified flow diagram of an embodiment of a process for determining, offering and, managing shopper-specific earnable rewards.

Referring now to FIG. 8, a simplified flow diagram is shown of a process 800 for determining, offering and managing shopper-specific, earnable (personal) rewards. Illustratively, the process 800 is executed by the processor 50 of the shopper reward server 12, although this disclosure contemplates embodiments in which the process 50 is executed in whole or in part by one or more other processors communicatively coupled to the processor 50 via the communication circuitry 58 of the shopper reward server 12. For purposes of this disclosure, however, the process 800 will be described as being executed by the processor 50. Illustratively, the process 800 selectively executed, i.e., whenever accessed by a shopper for the purpose of selecting an earn requirement and associated discount reward. For example, the process 800 begins at step 802 where the processor 50 detects that a shopper has selected the personal rewards feature, thereby invoking the process 800. Thereafter at step 804, the processor 50 executes an automated process which generates a plurality of different earn-reward pairs based on the shoppers purchase history.

Figure 9:
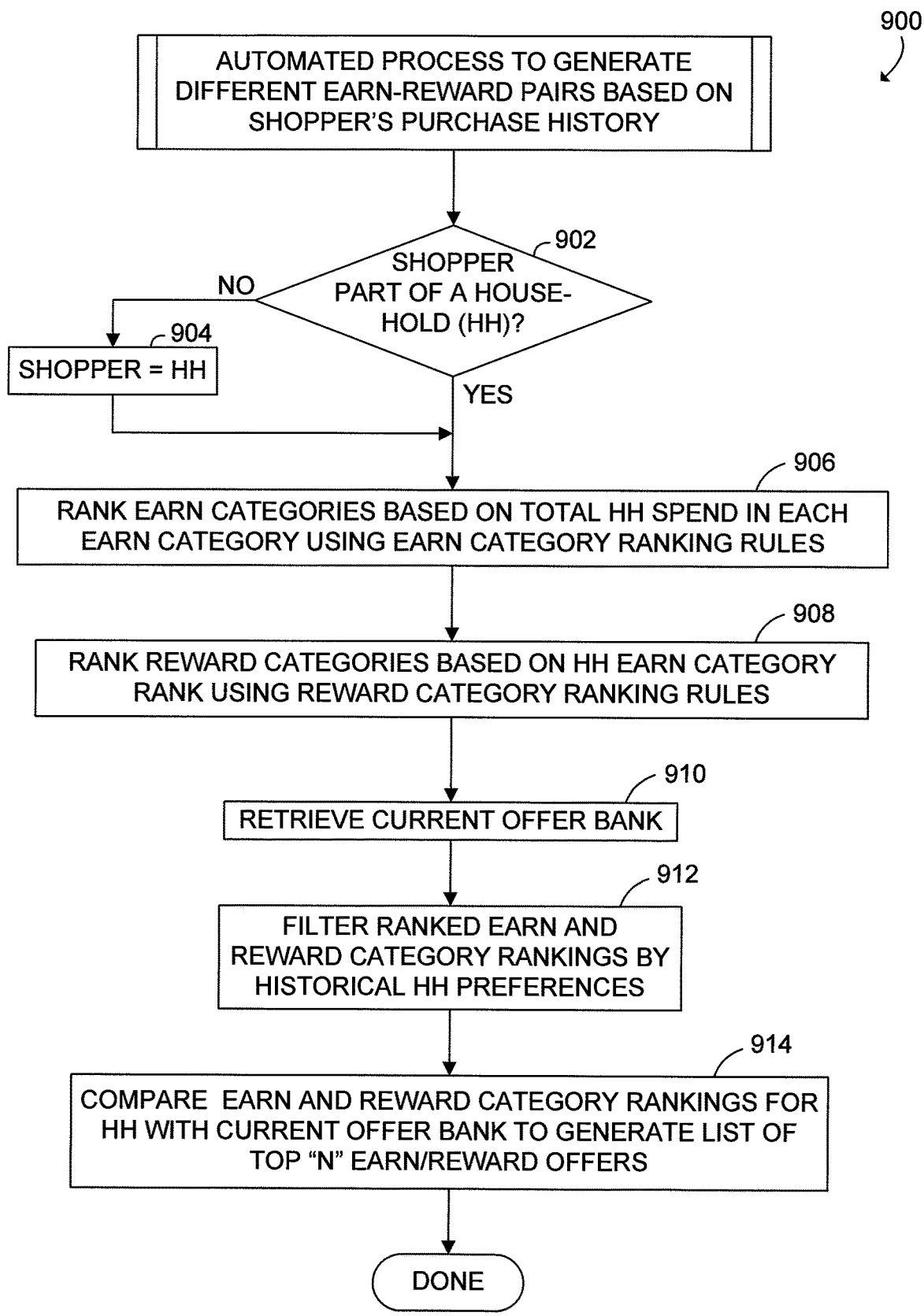
FIG. 9 is a simplified flow diagram of an embodiment of a process for generating multiple different selectable, shopper-specific, goal-based, earnable rewards, based on a specific shoppers purchase history, used by the process illustrated in FIG. 8.

Referring now to FIG. 9, a simplified flow diagram is shown of an embodiment of such an automated process 900 for generating a plurality of different earn-reward pairs based on the shoppers purchase history. The process 900 is also executed by the processor 50 and begins at step 902 where the processor 50 determines whether the shopper is an individual shopper or is part of a household as this term is defined above. If the latter, the shopper is identified with the corresponding household at step 904, and in either case the process 900 advances to step 906 where the processor 50 calculates earn category rankings for each of the earn categories relative to the other earn categories based on the current total spend amounts by the shopper for each earn category using the earn category ranking rules defined in the rewards rules database 406. In the embodiment described above in which the earn category ranking rules for the household earn ranking define household spending penetration (spending penetration by only a single shopper or household) in earn categories to be inversely proportional to the household earn ranking, the result of step 906 will be a list of the earn categories in descending order of household spending penetration.

Following step 906, the process 900 advances to step 908 where the processor 50 calculates reward category rankings for each of the reward categories and types relative to the other reward categories and types based on the earn category rankings calculated at step 906 using the reward category ranking rules defined in the rewards rules database 406. In the embodiment described above in which the reward category ranking rules define the household reward category rankings to be inversely proportional to the relative engagement of the shopper or household so that higher value discount rewards are offered to lesser engaged shoppers or households, the result of step 908 will be a list of the reward categories and types, matching with corresponding ones of the earn categories in the earn category ranking list calculated at step 906, in which the discount rewards are in ascending order of household engagement.

Following step 908, the process 900 advances to step 910 where the processor retrieves the current offer bank from the offer bank database 410, and thereafter at step 912 the processor 50 filters the earn and reward category rankings by historical household preferences. Examples of such historical household preferences may include, but are not limited to, types and amounts of discount rewards redeemed by the household in the past, types and amount of earned discount rewards that were not redeemed in the past, types, categories and amounts of earn requirements and associated discount rewards selected in the past, etc. In any case, following step 912 in which the earn and reward category rankings are filtered by one or more historical household preferences, the process 900 advances to step 914 where the processor 50 compares the earn and reward category rankings determined at steps 908 and 908 respectively, and filtered by historical household preferences at step 910, with the current offer bank to generate a list of the top "N" earn/reward pair offers, where N may be any positive integer.

Referring again to FIG. 8, the process 800 advances from step 804 to step 806 where the processor 50 presents the shopper, e.g., via a display carried by the shopper device, with the number, N, or a subset thereof, of the different earn/reward pairs resulting from the process 900 illustrated in FIG. 9. Thereafter at step 808, the shopper selects one of the earn/reward pairs from the list, and thereafter at step 810 the processor 50 monitors subsequent purchase activity of the shopper and tracks the progress toward the selected reward as the shopper makes purchases toward the selected earn requirement. Optionally, as shown by dashed-line representation in FIG. 8, the process 800 may further include a step 812 in which the processor 50 provides a selectable graphic interface, e.g., via a display of the shopper device, to display the shopper's progress toward the selected reward. In any case, the process 800 advances to step 814 where the processor 50 notifies the shopper, e.g., via a display of the shopper device, that the selected discount reward has been earned and automatically adds the discount reward to the shopper's reward repository 414 if the processor 50 determines that the shopper satisfied the corresponding earn requirement with the earn time period for the selected earn requirement defined in the rewards rules database 406. Thereafter at step 816, the processor 50 again monitors the shopper's subsequent purchase activity and redeems the earned discount reward, e.g., at the request of the shopper, against at least one specified item, e.g., a specified product or service. If the shopper does not redeem the earned discount reward within the reward redemption time period for the selected discount reward defined in the rewards rules database 40 the processor 50 illustratively denies redemption of the selected discount reward.

Figure 10:
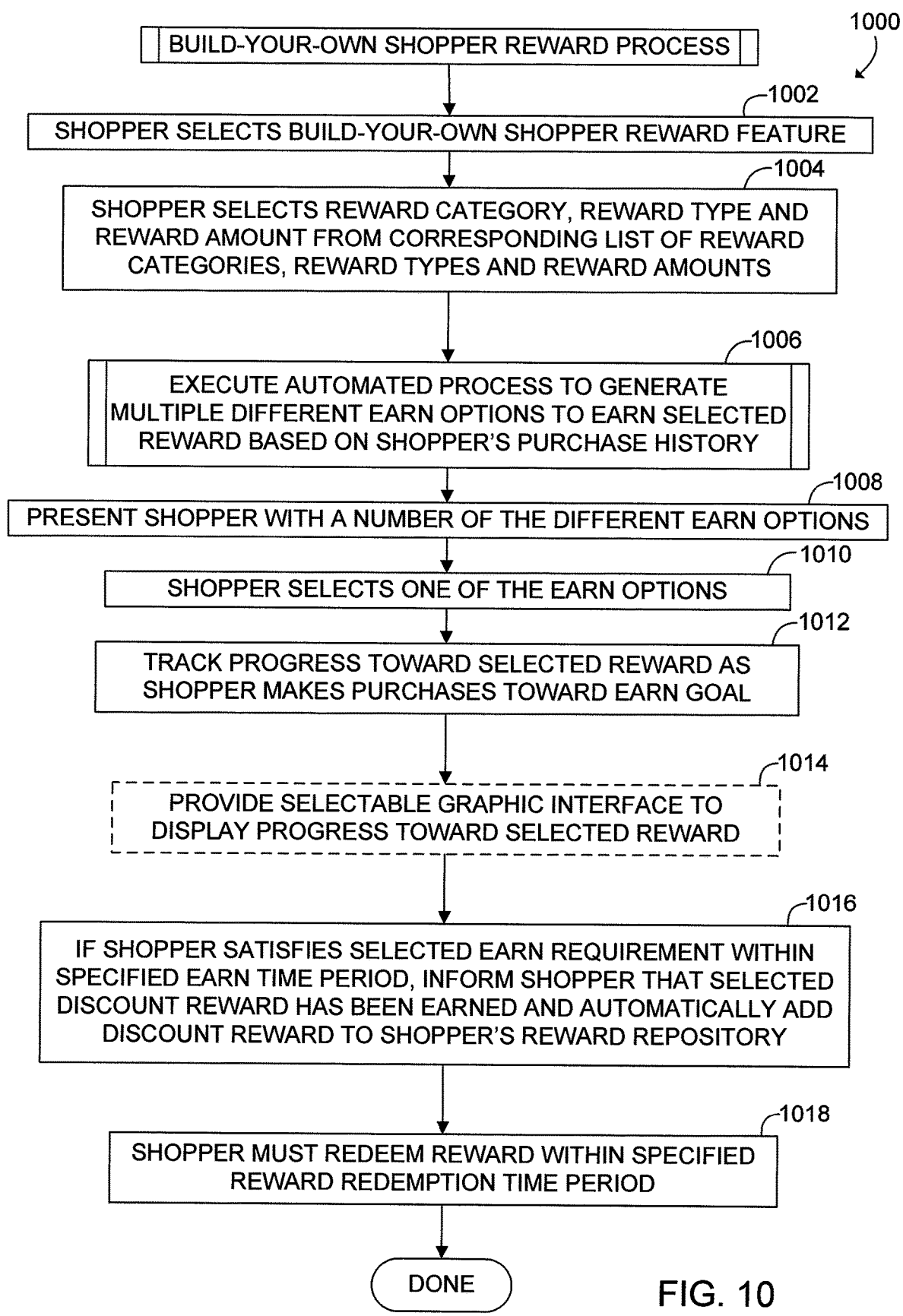
FIG. 10 is a simplified flow diagram of an embodiment of a process for generating and managing shopper-defined earnable rewards.

Referring now to FIG. 10, a simplified flow diagram is shown of a process 1000 for generating and managing shopper-defined (build-your-own), earnable rewards. Illustratively, the process 1000 is executed by the processor 50 of the shopper reward server 12, although this disclosure contemplates embodiments in which the process 50 is executed in whole or in part by one or more other processors communicatively coupled to the processor 50 via the communication circuitry 58 of the shopper reward server 12. For purposes of this disclosure, however, the process 1000 will be described as being executed by the processor 50. Illustratively, the process 1000 is selectively executed, i.e., whenever accessed by a shopper for the purpose of specifying a discount reward and selecting a corresponding earn requirement. For example, the process 1000 begins at step 1002 where the processor 50 detects that a shopper has selected the build-your-own rewards feature, thereby invoking the process 1000. Thereafter at step 1004, the shopper selects, e.g., from a list displayed on the shopper's display, a reward category, type and amount that the shopper wishes to earn. Thereafter at step 1006, the processor 50 executes an automated process which generates a plurality of different earn options to earn the selected discount reward based on the shopper's purchase history.

Figure 11:
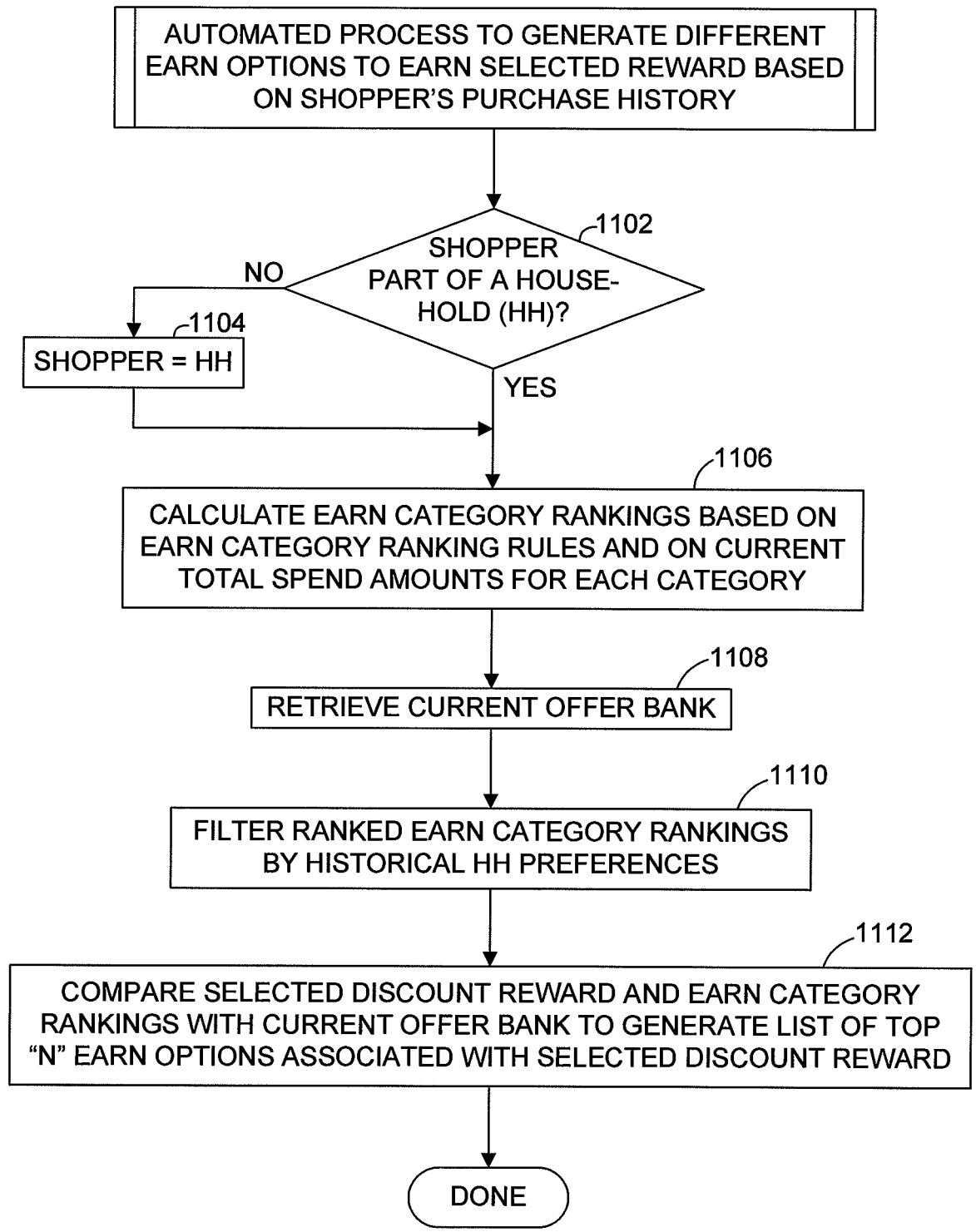
FIG. 11 is a simplified flow diagram of an embodiment of a process for generating multiple different selectable shopper-spending goals required to earn a shopper-defined earnable reward specified by a shopper during execution of the process illustrated in FIG. 10, based on a specific shopper's purchase history.

Referring now to FIG. 11, a simplified flow diagram is shown of an embodiment of such an automated process 1100 for generating a plurality of different earn options to earn the selected discount reward based on the shopper's purchase history. The process 1100 is also executed by the processor 50 and begins at step 1102 where the processor 50 determines whether the shopper is an individual shopper or is part of a household as this term is defined above. If the latter, the shopper is identified with the corresponding household at step 1104, and in either case the process 1100 advances to step 1106 where the processor 50 calculates earn category rankings for each of the earn categories relative to the other earn categories based on the current total spend amounts by the shopper for each earn category using the earn category ranking rules defined in the rewards rules database 406. This step is illustratively identical to step 906 in the process 900 illustrated in FIG. 9.

Following step 1106, the process 1100 advances to step 1108 where the processor 50 retrieves the current offer bank from the offer bank database 410, and thereafter at step 1110 the processor 50 filters the earn category rankings by historical household preferences in the same manner described above with respect to FIG. 9. In any case, following step 1110 the process 1100 advances to step 1112 where the processor 50 compares the selected discount reward and the earn category rankings determined at step 1106, filtered by historical household preferences at step 1108, with the current offer bank to generate a list of the top "N" different earn options associated with the selected discount reward, where N may be any positive integer.

Referring again to FIG. 10, the process 1000 advances from step 1006 to step 1008 where the processor 50 presents the shopper, e.g., via a display carried by the shopper device, with the number, N, or a subset thereof, of the different earn options resulting from the process 1100 illustrated in FIG. 11. Thereafter at step 1010, the shopper selects one of the earn options from the list, and thereafter at step 1012 the processor 50 monitors subsequent purchase activity of the shopper and tracks the progress toward the selected discount reward as the shopper makes purchases toward the selected earn requirement. Optionally, as shown by dashed-line representation in FIG. 10, the process 1000 may further include a step 1014 in which the processor 50 provides a selectable graphic interface, e.g., via a display of the shopper device, to display the shopper's progress toward the selected discount reward. In any case, the process 1000 advances to step 1016 where the processor 50 notifies the shopper, e.g., via a display of the shopper device, that the selected discount reward has been earned and automatically adds the discount reward to the shopper's reward repository 414 if the processor 50 determines that the shopper satisfied the corresponding earn requirement with the earn time period for the selected earn requirement defined in the rewards rules database 406. Thereafter at step 1018, the processor 50 again monitors the shopper's subsequent purchase activity and redeems the earned discount reward, e.g., at the request of the shopper, against at least one specified item, e.g., a specified product or service. If the shopper does not redeem the earned discount reward within the reward redemption time period for the selected discount reward defined in the rewards rules database 406, the processor 50 illustratively denies redemption of the selected discount reward.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A shopper reward server, comprising:

a communication module to receive purchase transaction data from a plurality of purchase interfaces of a retail enterprise, the purchase transaction data relating to items purchased by shoppers during purchase transactions carried out via the plurality of purchase interfaces;

a database having stored therein a plurality of shopper purchase histories each including purchase transaction data for item purchases made over time by a different one of a corresponding plurality of shoppers;

a transaction module to store purchase transaction data for each of the plurality of shoppers in a corresponding one of the plurality of shopper purchase histories; and a shopper reward module to (a) selectively generate for each of one or more of the plurality of shoppers a plurality of pairs of discount rewards and associated earn requirements each based on that shopper's one of the plurality of shopper purchase histories, each of the plurality of discount rewards defining a product or service discount redeemable via one or more of the plurality of purchase interfaces of the retail enterprise, and each of the plurality of earn requirements defining a threshold spend amount that must be subsequently spent by that shopper in at least a plurality of purchase transactions at one or more of the plurality of purchase interfaces on the purchase of at least one of a specified product or service, one or more products or services of a specified product or service type, one or more products or services in a specified product or service grouping and one or more products or services in a specified product or service business area of the retail enterprise in order to earn the one of the plurality of discount rewards paired therewith, (b) to cause a remote computing device or mobile communication device associated with that shopper to display thereon the plurality of pairs of discount rewards and associated earn requirements generated by the shopper reward module for that shopper, (c) to receive a selection, specified through user interaction with the remote computing device or mobile communication device, of one discount reward and associated earn requirement pair from the displayed plurality of pairs of discount rewards and associated earn requirements, and wherein the shopper reward module to add the selected discount reward to that shopper's rewards repository only if the total amount spent by that shopper against the selected earn requirement has reached at least the threshold spend amount associated with the selected earn requirement within a specified earn time period following receipt by the shopper rewards server of the selection of the one discount reward and associated earn requirement pair (d) to thereafter monitor subsequent purchase transactions of that shopper via the purchase transaction data received by the communication module from the plurality of purchase interfaces, track therefrom progress toward the threshold spend amount associated with the selected earn requirement made with each subsequent purchase transaction at any the plurality of purchase interfaces against the selected earn requirement, and automatically provide the selected discount reward for use by that shopper at any of the plurality of purchase interfaces upon determining from the at least the plurality of subsequent purchase transactions made against the selected earn requirement that a total amount spent by that shopper against the selected earn requirement has reached at least the threshold spend amount associated with the selected earn requirement.

2. The shopper reward server of claim 1, wherein the database includes a rewards repository for each of the plurality of shoppers:

and wherein the shopper reward module to automatically provide the selected discount reward for use by that shopper at any of the plurality of purchase interfaces by adding the selected discount reward to that shopper's rewards repository.

3. The shopper reward server of claim 2, wherein the shopper reward module to allow redemption from that shopper's reward repository at any of the plurality of purchase interfaces of the selected discount reward only if the selected discount reward is redeemed from that shopper's reward repository at one of the plurality of purchase interfaces within a reward redemption time period following addition of the selected discount reward to that shopper's rewards repository.

4. The shopper reward server of claim 1, wherein the database has stored therein at least one set of earn rules defining a plurality of earn categories each corresponding to a different category of one or more products or services offered for sale by the retail enterprise; and
  wherein the purchase transaction data stored in each of the plurality of shopper purchase histories includes an identification of, and amount paid for, each item purchased by the corresponding shopper over time; and
  wherein the shopper reward server further comprises a shopper history management module to process the purchase transaction data in each of the plurality of shopper purchase histories to, for each item identified therein, match the item to one of the plurality of earn categories with which the item is associated, add the amount paid for the item to a total amount spent by the corresponding shopper in the matching one of the plurality of earn categories, and add the amount paid for the item to a total amount spent by all of the plurality of shoppers in the matching one of the plurality of earn categories.

5. The shopper reward server of claim 4, wherein the at least one set of earn rules defines at least one set of earn category ranking rules for ranking each of the plurality of earn categories relative to each other as a function of the total amount spent by all of the plurality of shoppers in each of the plurality of earn categories.

6. The shopper reward server of claim 5, further comprising an offer bank management module to calculate and periodically update earn category rankings for each of the plurality of earn categories relative to each other based on the at least one set of earn category ranking rules and on a most recently determined value of the total amount spent by all of the plurality of shoppers in each of the plurality of earn categories.

7. The shopper reward server of claim 6, wherein the at least one set of earn rules defines minimum and maximum spend thresholds for each of the plurality of earn categories, and further defines a plurality of spend ranges between the defined minimum and maximum spend thresholds of each of the plurality of earn categories; and
  wherein the at least one set of earn rules defines at least one set of earn margin rules for establishing an earn margin for each of the plurality of earn categories, each earn margin defining a number of spend range increments as a function of the total amount spent by all of the plurality of shoppers in each of the plurality of earn categories.

8. The shopper reward server of claim 7, wherein the offer bank management module to calculate and periodically update earn margins for each of the plurality of earn categories based on the at least one set of earn margin rules and on a most recently determined value of the total amount spent by all of the plurality of shoppers in each of the plurality of earn categories.

9. The shopper reward server of claim 8, wherein the database has stored therein at least one set of reward rules defining a plurality of reward categories each corresponding to a different category of one or more products or services offered for sale by the retail enterprise, and a plurality of reward types each corresponding to a different type of discount reward; and
  wherein the at least one set of reward rules defines minimum and maximum reward thresholds for each of the plurality of reward categories and reward types, and further defines a plurality of reward increments between the defined minimum and maximum reward thresholds of each of the plurality of reward categories and reward types; and
  wherein the at least one set of reward rules defines at least one set of reward category and reward type ranking rules for ranking each of the plurality of reward categories and reward types relative to each other as a function of the earn category rankings for each of the plurality of earn categories.

10. The shopper reward server of claim 9, wherein the offer bank management module to generate, store in the database and periodically update an offer bank containing a matrix of pairs of earn requirements and associated discount rewards based on all combinations of the plurality of earn categories, the plurality of spend ranges between the defined minimum and maximum spend thresholds of each of the plurality of earn categories, the earn category rankings for each of the plurality of earn categories, the earn margins for each of the plurality of earn categories, the plurality of reward categories, the plurality of reward types, reward category and type rankings for each of the plurality of reward categories and reward types respectively, and the plurality of reward increments between the defined minimum and maximum reward thresholds of each of the plurality of reward categories and reward types.

11. The shopper reward server of claim 10, wherein the shopper reward module to generate the plurality of pairs of discount rewards and associated earn requirements specific to that shopper from the matrix of pairs of earn requirements and associated discount rewards based on that shopper's one of the plurality of shopper purchase histories.

12. The shopper reward server of claim 11, wherein the shopper reward module to determine a shopper-specific ranking of each of the plurality of earn categories relative to each other based on the total amount spent by that shopper in each of the plurality of earn categories, to determine a shopper-specific ranking of each of the plurality of reward categories based on the shopper-specific rankings of the plurality of earn categories, and to generate the plurality of pairs of discount rewards and associated earn requirements based on a comparison of the shopper-specific rankings of the plurality of earn categories and the shopper-specific rankings of the plurality of reward categories with the matrix of pairs of earn requirements and associated discount rewards stored in the offer.

13. The shopper reward server of claim 12, wherein the shopper reward module to filter the shopper-specific rankings of the plurality of earn categories and the shopper-specific rankings of the plurality of reward categories based on historical discount reward selection preferences of that shopper prior to generating the plurality of pairs of discount rewards and associated earn.

14. The shopper reward server of claim 1, wherein the plurality of purchase interfaces includes one or more point-of-sale terminals communicatively coupled to the communication module.

15. The shopper reward server of claim 1, wherein the plurality of purchase interfaces includes a web-based product purchase interface hosted by the shopper reward server.

16. A computer-implemented method for generating shopper-specific discount reward and associated earn requirement pairs and providing a shopper-selected one of the discount rewards for use by the shopper upon subsequent satisfaction by the shopper of the associated earn requirement, the method comprising:
- receiving, by a computing system, purchase transaction data from a plurality of purchase interfaces of a retail enterprise, the purchase transaction data relating to items purchased by shoppers during purchase transactions carried out via one or more of the plurality of purchase interfaces;
- storing, by the computing system, the purchase transaction data for each of a plurality of shoppers in a different one of a plurality of shopper purchase histories contained in a database such that each of the plurality of shopper purchase histories contains purchase transaction data for item purchases made over time by a different one of the plurality of shoppers;
- selectively generating, by the computing system for one of the plurality of shoppers, a plurality of pairs of discount rewards and associated earn requirements each based on that shopper's one of the plurality of shopper purchase histories, each of the plurality of discount rewards defining a product or service discount redeemable via one or more of the plurality of purchase interfaces of the retail enterprise, and each of the plurality of earn requirements defining a threshold spend amount that must be subsequently spent by that shopper in at least a plurality of purchase transactions at one or more of the plurality of purchase interfaces on the purchase of at least one of a specified product or service, one or more products or services of a specified product or service type, one or more products or services in a specified product or service grouping and one or more products or services in a specified product or service business area of the retail enterprise in order to earn the one of the plurality of discount rewards paired therewith;
- causing, by the computing system a remote computing device or mobile communication device associated with that shopper to display thereon the plurality of pairs of discount rewards and associated earn requirements generated by the shopper reward a module for that shopper;
- receiving, by the computing system, a selection, specified through user interaction with the remote computing device or mobile communication device, of one discount reward and associated earn requirement pair from the displayed plurality of pairs of discount rewards and associated earn requirements; and after receiving, by the computing system, the selected discount reward and associated earn requirement; monitoring, by the computing system, subsequent purchases of that shopper via the purchase transaction data received from the plurality of purchase interfaces;
- wherein adding by the computing system, the selected discount reward to that shopper's rewards repository only if the total amount spent by that shopper against the selected earn requirement has reached at least the threshold spend amount associated with the selected earn requirement within a specified earn time period following receipt by the shopper rewards server of the selection of the one discount reward and associated earn requirement pair;
- tracking, by the computing system from the subsequent purchase transactions—of that shopper, progress toward the threshold spend amount associated with the selected earn requirement made with each subsequent purchase transaction at any of the plurality of purchase interfaces against the selected earn requirement, and
- automatically providing, by the computing system, the selected discount reward for use by that shopper at any of the plurality of purchase interfaces upon determining from the at least the plurality of subsequent purchase transactions made against the selected earn requirement that a total amount spent by that shopper against the selected earn requirement has reached at least the threshold spend amount associated with the selected earn requirement.

17. The computer-implemented method of claim 16, wherein the database includes a rewards repository for each of the plurality of shoppers; and wherein the method further comprises automatically providing, by the computing system, the selected discount reward for use by that shopper at any of the plurality of purchase interfaces by adding the selected discount reward to that shopper's rewards repository.

18. The computer-implemented method of claim 17, further comprising allowing, by the computing system, redemption from that shopper's reward repository at any of the plurality of purchase interfaces of the selected discount reward only if the selected discount reward is redeemed from that shopper's reward repository at one of the plurality of purchase interfaces within a reward redemption time period following addition of the selected discount reward to that shopper's rewards repository.

19. The computer-implemented method of claim 16,
- wherein the database has stored therein at least one set of earn rules defining a plurality of earn categories each corresponding to a different category of one or more products or services offered for sale by the retail enterprise; and
- wherein the purchase transaction data stored in each of the plurality of shopper purchase histories includes an identification of, and amount paid for, each item purchased by the corresponding shopper over time; and
- wherein the method further comprises processing, by the computing system, the purchase transaction data in each of the plurality of shopper purchase histories to, for each item identified therein, match the item to one of the plurality of earn categories with which the item is associated, add the amount paid for the item to a total amount spent by the corresponding shopper in the matching one of the plurality of earn categories, and add the amount paid for the item to a total amount spent by all of the plurality of shoppers in the matching one of the plurality of earn categories.

20. The computer-implemented method of claim 19, wherein the at least one set of earn rules defines at least one set of earn category ranking rules for ranking each of the plurality of earn categories relative to each other as a function of the total amount spent by all of the plurality of shoppers in each of the plurality of earn categories; and
- wherein the method further comprises calculating and periodically updating, by the computing system, earn category rankings for each of the plurality of earn categories relative to each other based on the at least one set of earn category ranking rules and on a most recently determined value of the total amount spent by all of the plurality of shoppers in each of the plurality of earn categories.

21. The computer-implemented method of claim 20,
wherein the at least one set of earn rules defines minimum and maximum spend thresholds for each of the plurality of earn categories, and further defines a plurality of spend ranges between the defined minimum and maximum spend thresholds of each of the plurality of earn categories; and
wherein the at least one set of earn rules defines at least one set of earn margin rules for establishing an earn margin for each of the plurality of earn categories, each earn margin defining a number of spend range increments as a function of the total amount spent by all of the plurality of shoppers in each of the plurality of earn categories; and
wherein the method further comprises calculating and periodically updating, by the computing system, earn margins for each of the plurality of earn categories based on the at least one set of earn margin rules and on a most recently determined value of the total amount spent by all of the plurality of shoppers in each of the plurality of earn categories.

22. The computer-implemented method of claim 21, wherein the database has stored therein at least one set of reward rules defining a plurality of reward categories each corresponding to a different category of one or more products or services offered for sale by the retail enterprise, and a plurality of reward types each corresponding to a different type of discount reward; and
wherein the at least one set of reward rules defines minimum and maximum reward thresholds for each of the plurality of reward categories and reward types, and further defines a plurality of reward increments between the defined minimum and maximum reward thresholds of each of the plurality of reward categories and reward types; and
wherein the at least one set of reward rules defines at least one set of reward category and reward type ranking rules for ranking each of the plurality of reward categories and reward types relative to each other as a function of the earn category rankings for each of the plurality of earn categories; and
wherein the method further comprises generating, storing in the database and periodically updating, by the computing system, an offer bank containing a matrix of pairs of earn requirements and associated discount rewards based on all combinations of the plurality of earn categories, the plurality of spend ranges between the defined minimum and maximum spend thresholds of each of the plurality of earn categories, the earn category rankings for each of the plurality of earn categories, the earn margins for each of the plurality of earn categories, the plurality of reward categories, the plurality of reward types, reward category and type rankings for each of the plurality of reward categories and reward types respectively, and the plurality of reward increments between the defined minimum and maximum reward thresholds of each of the plurality of reward categories and reward types.

23. The computer-implemented method of claim 22, wherein selectively generating the plurality of pairs of discount rewards and associated earn requirements comprises generating, by the computing system, the plurality of pairs of discount rewards and associated earn requirements specific to that shopper from the matrix of pairs of earn requirements and associated discount rewards based on that shopper's one of the plurality of shopper purchase histories.

24. The computer-implemented method of claim 23, further comprising: determining, by the computing system, a shopper-specific ranking of each of the plurality of earn categories relative to each other based on the total amount spent by that shopper in each of the plurality of earn categories; and
determining, by the computing system, a shopper-specific ranking of each of the plurality of reward categories based on the shopper-specific rankings of the plurality of earn categories;
wherein selectively generating the plurality of pairs of discount rewards and associated earn requirements comprises generating, by the computing system, the plurality of pairs of discount rewards and associated earn requirements based on a comparison of the shopper-specific rankings of the plurality of earn categories and the shopper-specific rankings of the plurality of reward categories with the matrix of pairs of earn requirements and associated discount rewards stored in the offer bank.

25. The computer-implemented method of claim 24, further comprising filtering, by the computing system, the shopper-specific rankings of the plurality of earn categories and the shopper-specific rankings of the plurality of reward categories based on historical discount reward selection preferences of that shopper prior to generating the plurality of pairs of discount rewards and associated earn requirements.

26. The computer-implemented method of claim 16, wherein receiving the purchase transaction data from a plurality of purchase interfaces includes receiving the purchase transaction data from one or more point-of-sale terminals.

27. The computer-implemented method of claim 16, wherein receiving the purchase transaction data from a plurality of purchase interfaces includes receiving the purchase transaction data from a web-based product purchase interface hosted by a server associated with the retail enterprise.

28. One or more non-transitory computer readable media containing instructions for generating shopper-specific discount reward and associated earn requirement pairs and providing a shopper-selected one of the discount rewards for use by the shopper upon subsequent satisfaction by the shopper of the associated earn requirement, wherein execution of the instructions by one or more processors of a computing system cause the one or more processors to:
receive purchase transaction data from a plurality of purchase interfaces of a retail enterprise, the purchase transaction data relating to items purchased by shoppers during purchase transactions carried out via one or more of the plurality of purchase interfaces;
store the purchase transaction data for each of a plurality of shoppers in a different one of a plurality of shopper purchase histories contained in a database such that each of the plurality of shopper purchase histories contains purchase transaction data for item purchases made over time by a different one of the plurality of shoppers;
selectively generate for one of the plurality of shoppers a plurality of pairs of discount rewards and associated earn requirements each based on that shopper's one of the plurality of shopper purchase histories, each of the plurality of discount rewards defining a product or service discount redeemable via one or more of the plurality of purchase interfaces of the retail enterprise, and each of the plurality of earn requirements defining a threshold spend amount that must be subsequently spent by that shopper in at least a plurality of purchase transactions at one or more of the plurality of purchase interfaces on the purchase of at least one of a specified product or service, one or more products or services of a specified product or service type, one or more products or services in a specified product or service grouping and one or more products or services in a specified product or service business area of the retail enterprise in order to earn the one of the plurality of discount rewards paired therewith; cause a remote computing device or mobile communication device associated with that shopper to display thereon the plurality of pairs of discount rewards and associated earn requirements generated by the shopper reward module for that shopper;

receive a selection, specified through user interaction with the remote computing device or mobile communication device, of one discount reward and associated earn requirement pair from the displayed plurality of pairs of discount rewards and associated earn requirements; and after receiving the selected discount reward and associated earn requirement; monitor subsequent purchase transactions of that shopper via the purchase transaction data received from the plurality of purchase interfaces;

wherein execution of the instructions further causes the one or more processors to condition adding the selected discount reward to that shopper's rewards repository upon the total amount spent by that shopper against the selected earn requirement having reached at least the threshold spend amount associated with the selected earn requirement within a specified earn time period following receipt by the shopper rewards server of the selection of the one discount reward and associated earn requirement pair;

track, from the subsequent purchase transactions of that shopper, progress toward the threshold spend amount associated with the selected earn requirement made with each subsequent purchase transaction at any of the plurality of purchase interfaces against the selected earn requirement, and automatically provide the selected discount reward for use by that shopper at any of the plurality of purchase interfaces upon determining from the at least the plurality of subsequent purchase transactions made against the selected earn requirement that a total amount spent by that shopper against the selected earn requirement has reached at least the threshold spend amount associated with the selected earn requirement.

29. The one or more non-transitory computer readable media of claim 28, wherein the database includes a rewards repository for each of the plurality of shoppers; and wherein execution of the instructions further causes the one or more processors to automatically provide the selected discount reward for use by that shopper at any of the plurality of purchase interfaces by adding the selected discount reward to that shopper's rewards repository.

30. The one or more non-transitory computer readable media of claim 29, wherein execution of the instructions further causes the one or more processors to allow redemption from that shopper's reward repository at any of the plurality of purchase interfaces of the selected discount reward only if the selected discount reward is redeemed from that shopper's reward repository at one of the plurality of purchase interfaces within a reward redemption time period following addition of the selected discount reward to that shopper's rewards repository.

31. The one or more non-transitory computer readable media of claim 28, wherein the database has stored therein at least one set of earn rules defining a plurality of earn categories each corresponding to a different category of one or more products or services offered for sale by the retail enterprise; and wherein the purchase transaction data stored in each of the plurality of shopper purchase histories includes an identification of, and amount paid for, each item purchased by the corresponding shopper over time; and wherein execution of the instructions further causes the one or more processors to process the purchase transaction data in each of the plurality of shopper purchase histories to, for each item identified therein, match the item to one of the plurality of earn categories with which the item is associated, add the amount paid for the item to a total amount spent by the corresponding shopper in the matching one of the plurality of earn categories, and add the amount paid for the item to a total amount spent by all of the plurality of shoppers in the matching one of the plurality of earn categories.

32. The one or more non-transitory computer readable media of claim 31, wherein the at least one set of earn rules defines at least one set of earn category ranking rules for ranking each of the plurality of earn categories relative to each other as a function of the total amount spent by all of the plurality of shoppers in each of the plurality of earn categories; and wherein execution of the instructions further causes the one or more processors to calculate and periodically update earn category rankings for each of the plurality of earn categories relative to each other based on the at least one set of earn category ranking rules and on a most recently determined value of the total amount spent by all of the plurality of shoppers in each of the plurality of earn categories.

33. The one or more non-transitory computer readable media of claim 32, wherein the at least one set of earn rules defines minimum and maximum spend thresholds for each of the plurality of earn categories, and further defines a plurality of spend ranges between the defined minimum and maximum spend thresholds of each of the plurality of earn categories; and wherein the at least one set of earn rules defines at least one set of earn margin rules for establishing an earn margin for each of the plurality of earn categories, each earn margin defining a number of spend range increments as a function of the total amount spent by all of the plurality of shoppers in each of the plurality of earn categories; and wherein execution of the instructions further causes the one or more processors to calculate and periodically update earn margins for each of the plurality of earn categories based on the at least one set of earn margin rules and on a most recently determined value of the total amount spent by all of the plurality of shoppers in each of the plurality of earn categories.

34. The one or more non-transitory computer readable media of claim 33, wherein the database has stored therein at least one set of reward rules defining a plurality of reward categories each corresponding to a different category of one or more products or services offered for sale by the retail enterprise, and a plurality of reward types each corresponding to a different type of discount reward; and wherein the at least one set of reward rules defines minimum and maximum reward thresholds for each of the plurality of reward categories and reward types, and further defines a plurality of reward increments between the defined minimum and maximum reward thresholds of each of the plurality of reward categories and reward types; and wherein the at least one set of reward rules defines at least one set of reward category and reward type ranking rules for ranking each of the plurality of reward categories and reward types relative to each other as a function of the earn category rankings for each of the plurality of earn categories; and wherein execution of the instructions further causes the one or more processors to generate, store in the database and periodically update an offer bank containing a matrix of pairs of earn requirements and associated discount rewards based on all combinations of the plurality of earn categories, the plurality of spend ranges between the defined minimum and maximum spend thresholds of each of the plurality of earn categories, the earn category rankings for each of the plurality of earn categories, the earn margins for each of the plurality of earn categories, the plurality of reward categories, the plurality of reward types, reward category and type rankings for each of the plurality of reward categories and reward types respectively, and the plurality of reward increments between the defined minimum and maximum reward thresholds of each of the plurality of reward categories and reward types.

35. The one or more non-transitory computer readable media of claim 34, wherein execution of the instructions further causes the one or more processors to selectively generate the plurality of pairs of discount rewards and associated earn requirements by generating the plurality of pairs of discount rewards and associated earn requirements specific to that shopper from the matrix of pairs of earn requirements and associated discount rewards based on that shopper's one of the plurality of shopper purchase histories.

36. The one or more non-transitory computer readable media of claim 35, wherein execution of the instructions further causes the one or more processors to:
determine a shopper-specific ranking of each of the plurality of earn categories relative to each other based on the total amount spent by that shopper in each of the plurality of earn categories;
determine a shopper-specific ranking of each of the plurality of reward categories based on the shopper-specific rankings of the plurality of earn categories; and
selectively generate the plurality of pairs of discount rewards and associated earn requirements by generating the plurality of pairs of discount rewards and associated earn requirements based on a comparison of the shopper-specific rankings of the plurality of earn categories and the shopper-specific rankings of the plurality of reward categories with the matrix of pairs of earn requirements and associated discount rewards stored in the offer bank.

37. The one or more non-transitory computer readable media of claim 36, wherein execution of the instructions further causes the one or more processors to filter the shopper-specific rankings of the plurality of earn categories and the shopper-specific rankings of the plurality of reward categories based on historical discount reward selection preferences of that shopper prior to generating the plurality of pairs of discount rewards and associated earn requirements.

38. The one or more non-transitory computer readable media of claim 28, wherein execution of the instructions further causes the one or more processors to include, in receiving the purchase transaction data, receiving the purchase transaction data from one or more point-of-sale terminals.

39. The one or more non-transitory computer readable media of claim 28, wherein execution of the instructions further causes the one or more processors to include, in receiving the purchase transaction data, receiving the purchase transaction data from a web-based product purchase interface hosted by a server associated with the retail enterprise.

40. The server of claim 1, wherein the database has stored therein at least one set of rules that define earn requirements based on the plurality of shopper purchase histories and that define product or service discounts, and wherein the shopper reward module selectively generates the plurality of pairs of discount rewards and associated earn requirements by evaluating that shopper's one of the plurality of shopper purchase histories against the at least one set of rules.

41. The method of claim 16, wherein the database has stored therein at least one set of rules that define earn requirements based on the plurality of shopper purchase histories and that define product or service discounts, and wherein selectively generating the plurality of pairs of discount rewards and associated earn requirements includes evaluating that shopper's one of the plurality of shopper purchase histories against the at least one set of rules.

42. The one or more non-transitory computer readable media of claim 28, wherein execution of the instructions further causes the one or more processors to include in the database at least one set of rules that define earn requirements based on the plurality of shopper purchase histories and that define product or service discounts, and wherein execution of the instructions further causes the one or more processors to selectively generate the plurality of pairs of discount rewards and associated earn requirements by evaluating that shopper's one of the plurality of shopper purchase histories against the at least one set of rules.

* * * * *